United States Patent [19]

Hutchison et al.

[11] Patent Number: 5,238,267

[45] Date of Patent: Aug. 24, 1993

[54] VEHICLE STRUCTURE

[75] Inventors: Wayne R. Hutchison, Mayville; Jon M. Patterson, Wauwatosa; Eugene G. Hayes, Beaver Dam; Daniel A. Sebben, West Bend; Richard D. Teal, Horicon, all of Wis.; Steven C. Wasson, Midland, Mich.; David R. Daniel, Midland, Mich.; Mansour Mirdamadi, Midland, Mich.; Earl T. Moore, Midland, Mich.; Luis Lorenzo, Midland, Mich.; Robert J. Cleereman, Midland, Mich.; Michael J. Coffey, Sanford, Mich.

[73] Assignee: Deere & Company, Moline, Ill.

[21] Appl. No.: 715,933

[22] Filed: Jun. 14, 1991

[51] Int. Cl.$^5$ ............................................. B62D 21/00
[52] U.S. Cl. ................................... 280/781; 280/785; 180/89.1; 180/312; 296/203; 296/901
[58] Field of Search ............... 280/781, 785; 180/89.1, 180/312, 350; 296/203, 901

[56] References Cited

U.S. PATENT DOCUMENTS

| D. 311,921 | 11/1990 | Popelier et al. | D15/15 |
| 4,896,899 | 1/1990 | Lawrence | 180/350 |
| 4,969,533 | 11/1990 | Holm et al. | 180/273 |

OTHER PUBLICATIONS

*Preliminary Feasibility Study*, containing information generated and produced by employees of The Dow Chemical Co. and Deere & Company, pp. 1–205, including four sub-lettered pages, co-generated prior to 1 Sep. 1989 and confidentially shared between The Dow Chemical Co. and Deere & Company in the U.S.A.

The Dow Chemical Co., "*If Man Were Meant To Fly, God Would Have Given Him Wings, You'll Never See A Computer Small Enough To Fit On A Desk, Steel Is For Cars, Aluminum Is For Airplanes, Plastic Is For Toys,*" 12 pages, Apr. 1989, published in U.S.A.

Deere & Company, *John Deere Riding Mowers*, 8 pages, 1990, published in U.S.A.

Vicki P. McConnell of the magazine *Advanced Composite, In the Fast Track: Composites in Race Cars*, 8 pages, Mar.–Apr. 1991, published in U.S.A.

Christopher A. Sawyer of Automotive Industries magazine, article entitled *$63 Million Supercar*, 3 pages, Mar. 1991, published in U.S.A.

Ram Industries brochure entitled *Model Ram 80M*, 2 pages, date unknown but prior to 1990, published in U.S.A.

Private correspondence from Eagle-Picher to a Deere & Company employee in the U.S.A., including two pages of drawings and letter, 5 pages, 18 Mar. 1987.

Stuart Birch of Automotive Engineering Magazine, *Global Viewpoints*, 2 pages, Jan. 1990, published in U.S.A.

Deere & Company, *John Deere Telerobotics*, vehicle illustrations, 4 pages, published in U.S.A. prior to 1990.

Advanced Composites Magazine, *Speed Challenge By Composite's Sports Car Is No "Bump Steer"*, 1 page, Jan.–Feb. 1991, published in U.S.A.

General Electric Co., *Systems for Automated Manufacture*, 8 pages, date unknown, published in U.S.A.

Carron & Company, Inkster, Michigan, article entitled, *All-Plastic Concept Car*, 3 pages, Jul. 1987, published in U.S.A.

A. A. Adams of Lotus Car article entitled *Reinforced Plastic Composites in the Specialized Automotive and Other Industries*, 4 pages, Mar. 1987, published in U.S.A.

Stratime Cappello Systemes letter to Deere & Company, 10 pages, Nov. 1989, published in U.S.A.

Robert J. Cleereman, *Effective Use of Polymers in Durable Goods*, 22 pages, 7 Mar. 1988, published in U.S.A.

*Primary Examiner*—Kenneth R. Rice

[57] ABSTRACT

A plastic monocoque body useful with small vehicles, such as lawn and garden tractors. A lower fiberglass reinforced plastic frame member is bonded to two upper body members to form a monocoque body. The assembly incorporates attaching, pivot and support structures for the engine, transaxle and drive wheels, steerable front wheels, steering mechanism, clutch and brake pedals and control linkages, shift and throttle controls and linkages, adjustable mower deck, adjustable seat and battery. Through utilizing the net shape manufacturing process, no metal skeleton is required, thereby reducing the expense and complexity of manufacture, assembly and paint operations.

55 Claims, 17 Drawing Sheets

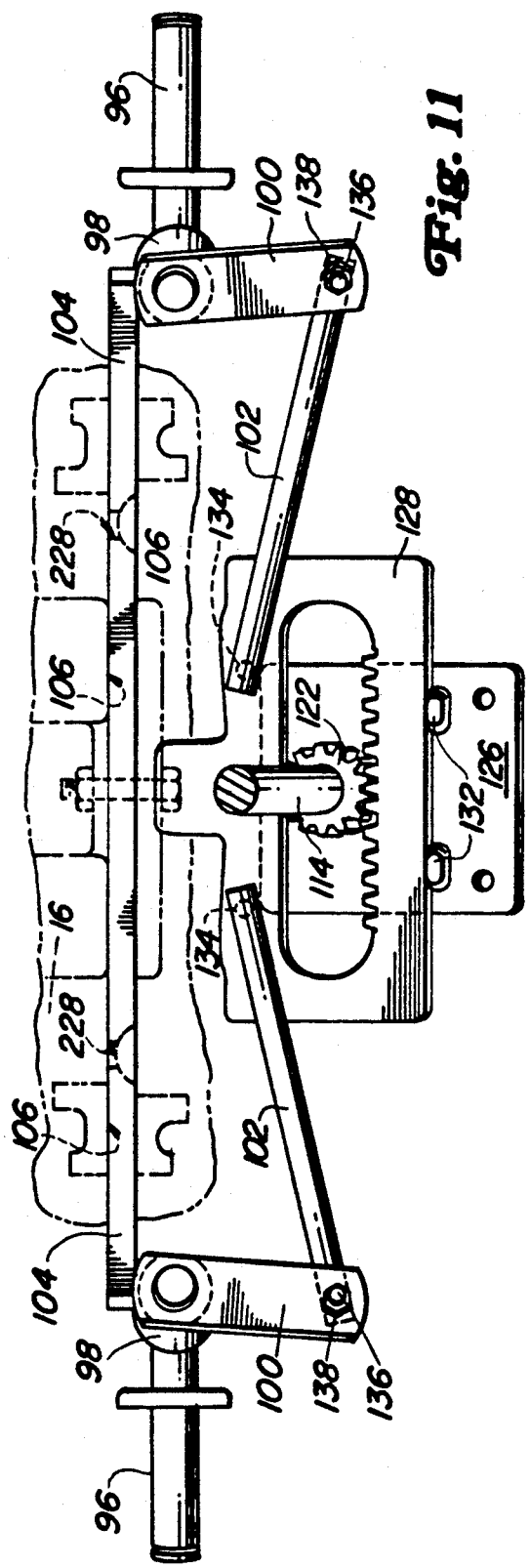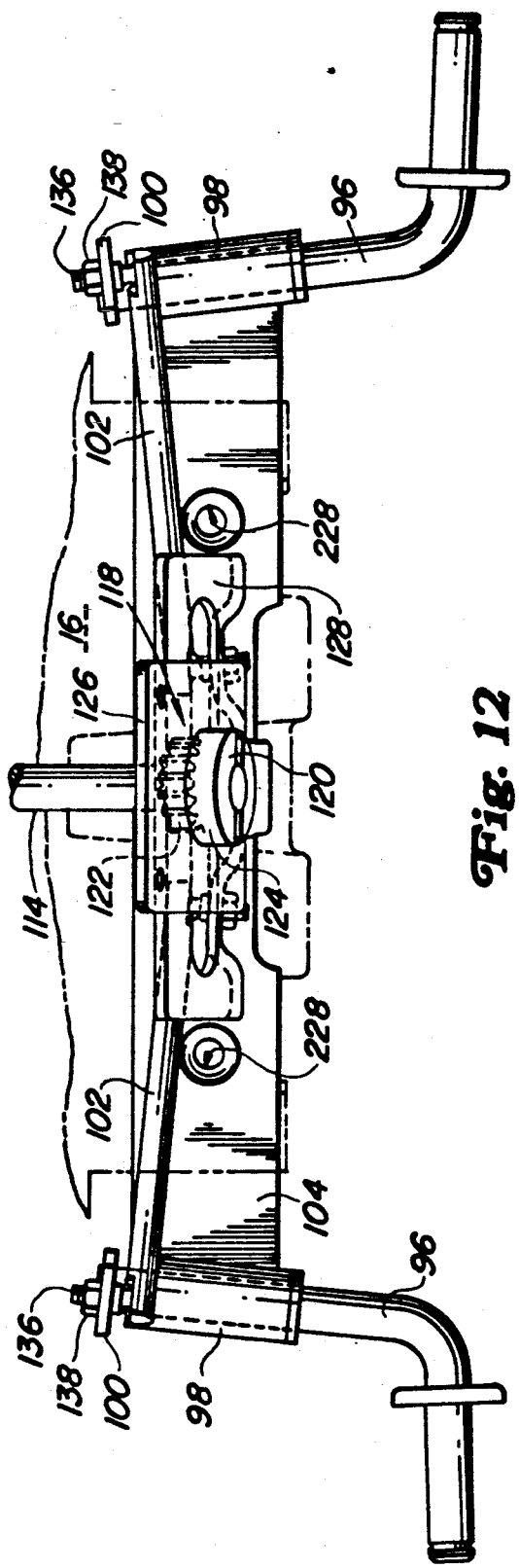

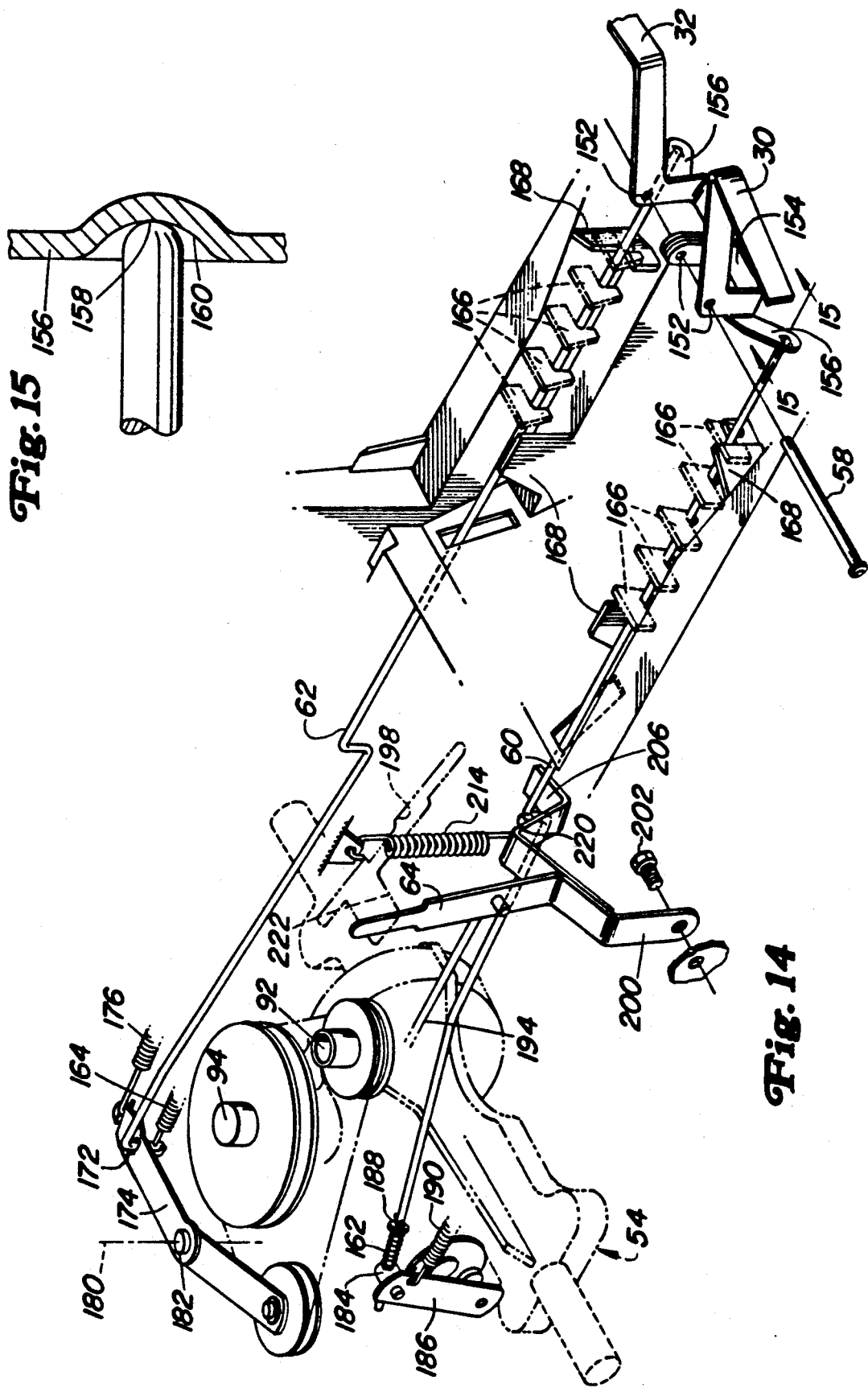

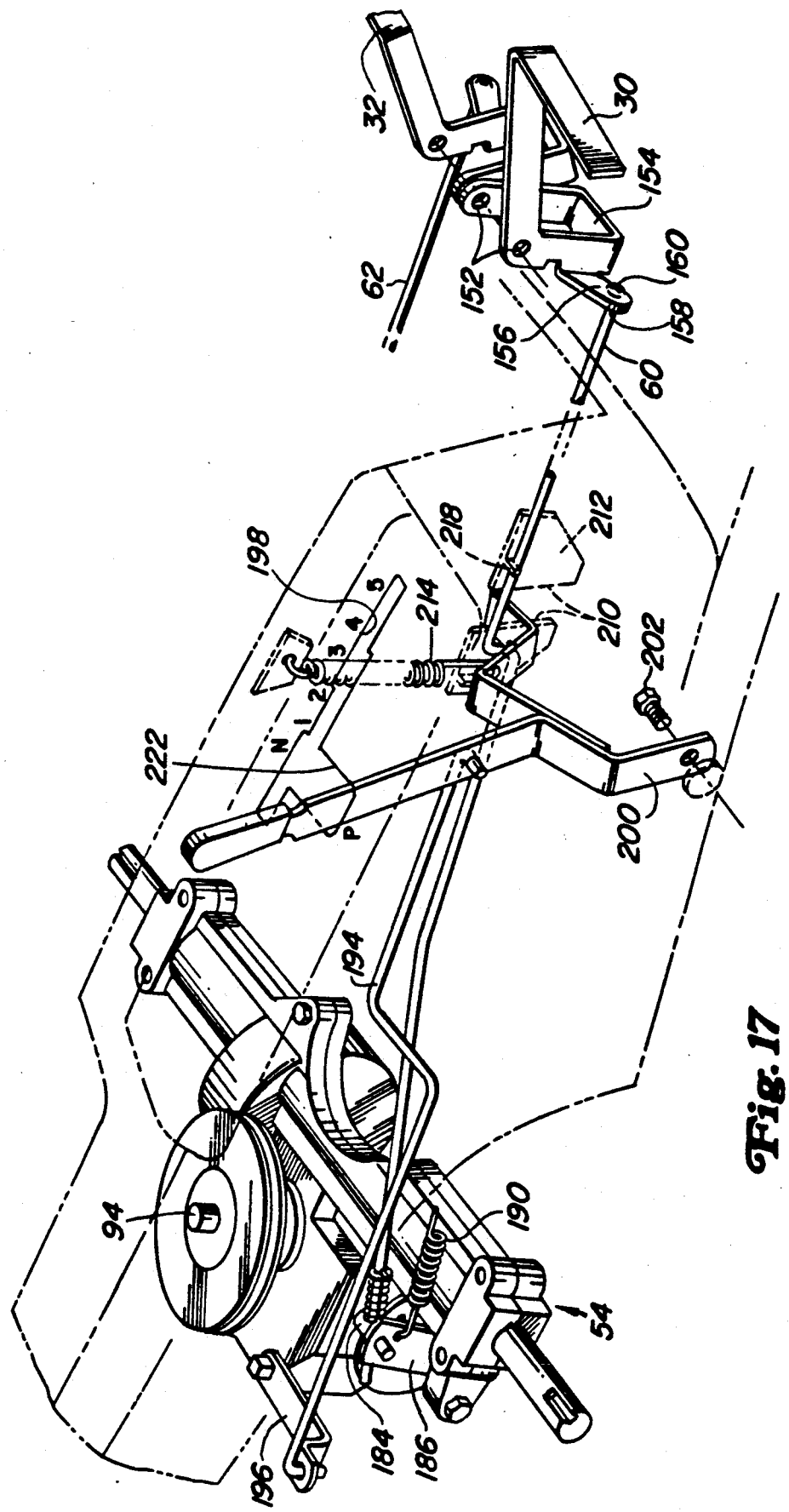

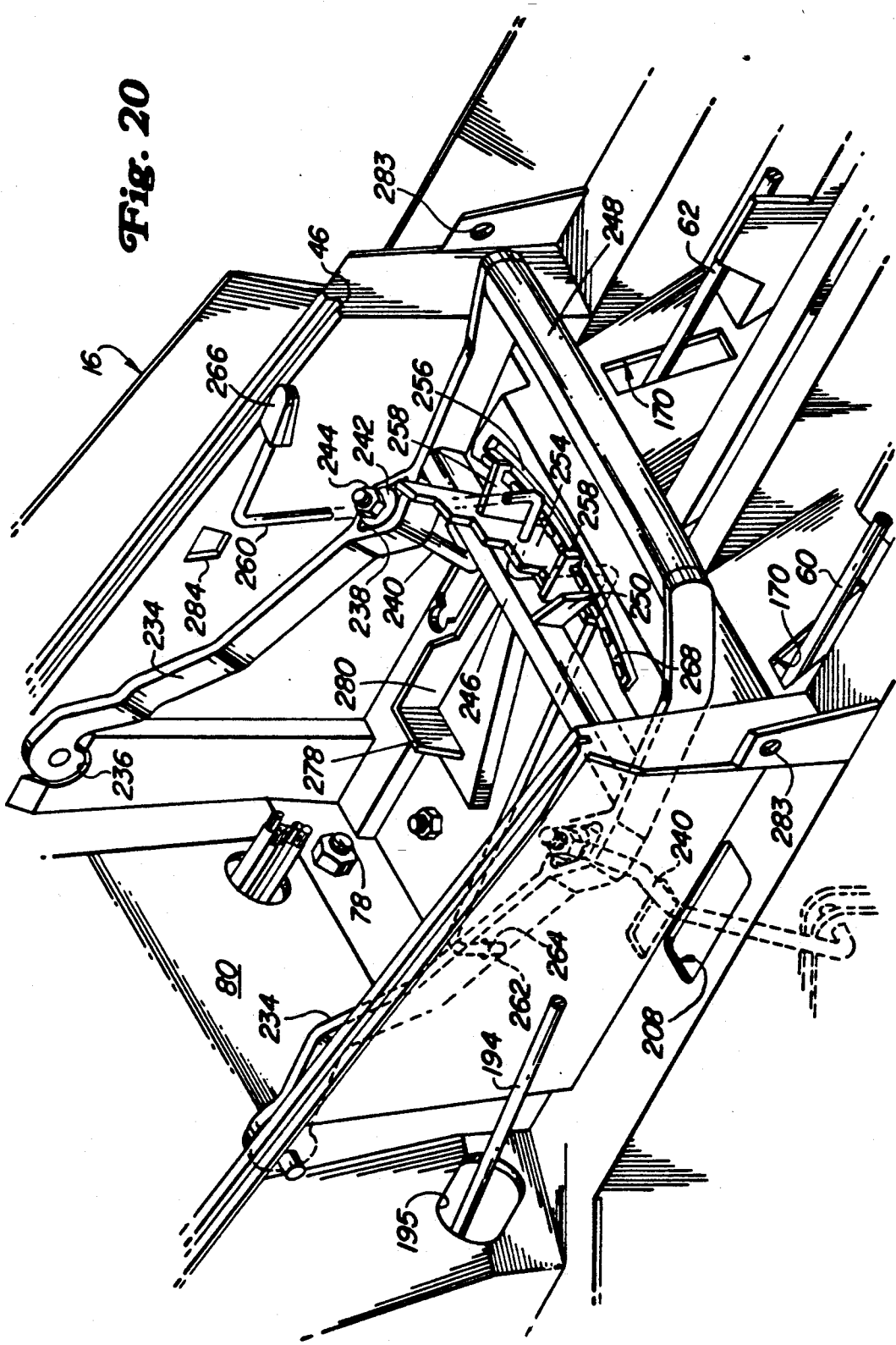

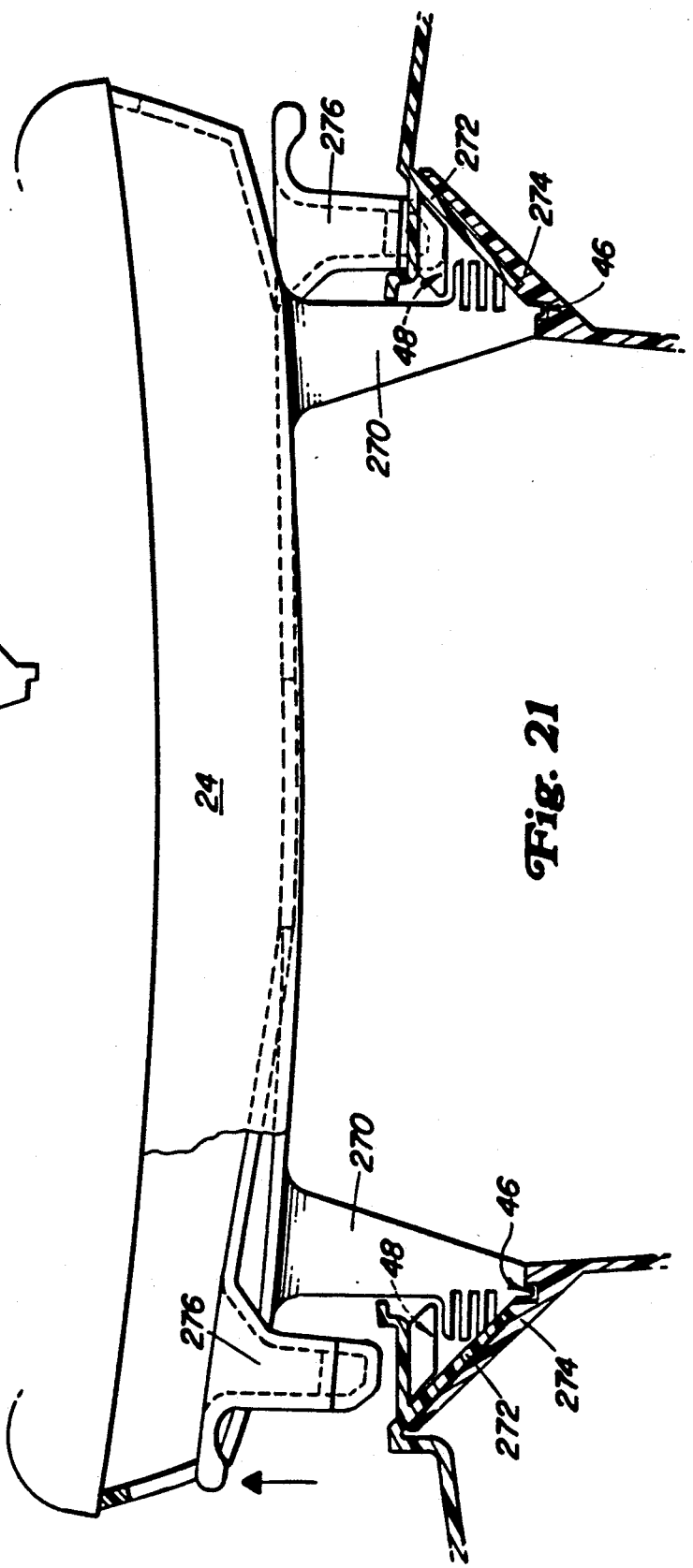
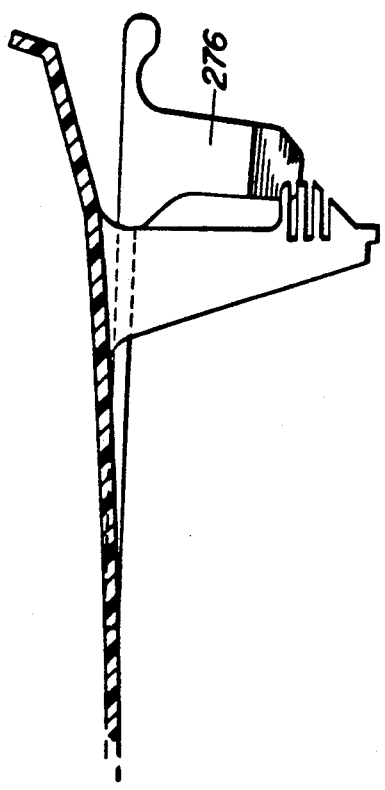

VEHICLE STRUCTURE

BACKGROUND OF THE INVENTION

1. Field of the Invention

The present invention relates to a frame and body structure for a vehicle, and more specifically to a three-piece monocoque body assembly for use with small vehicles, such as lawn and garden tractors.

2. Description of the Related Art

Present lawn and garden ride-on vehicles utilize a main frame and/or body structure that is typically manufactured from many individual pieces. The frame and many of the body parts are often made of metal and accordingly must be cut and/or stamped and then welded or bolted together The expense associated with such materials, manufacturing steps and assembly methods has caused manufacturers to look for alternative materials and production procedures. Some attempts have been made to utilize plastics in the manufacture of vehicle frames and bodies. Typically those efforts have been directed towards to use of fiber reinforced plastics (FRP) in order to obtain sufficient structural strength to withstand the torsional, bending and other loadings encountered by such vehicles.

While FRP structures have proven acceptable for some uses, vehicle applications have often utilized a metal strengthening skeleton to which the FRP parts and panels are then attached.

SUMMARY OF THE INVENTION

It would be desirable to provide a lawn and garden monocoque frame and body structure produced from plastic materials and therefor realize a reduction in material and processing expenses.

It would also be desirable to provide the plastic frame without a metal skeleton and yet with sufficient strength and rigidity to withstand the torsional, bending and impact loadings it would be expected to encounter.

It would further be desirable to provide a monocoque lawn and garden vehicle that includes in its form or net shape, supports for the engine and transaxle, the wheels and their pivotal connections, steering mechanism, the clutch and brake pedals and their connecting control linkages, the seat and its adjusting mechanism, and the mower deck and its adjusting mechanism.

With these objectives in mind, there is provided a lower frame and upper body structure for a lawn and garden ride-on tractor vehicle comprised of a monocoque body assembly. The frame is joined with a top body or shell structure which would in the preferred embodiment include two members that are first bonded together and then attached to the lower frame member. The upper body is preferably produced by an injection molding process to take advantage of material properties and integrate structural and appearance features into the body. To eliminate painting and/or surface finish operations, the body includes a high-gloss surface with molded-in color. One material found satisfactory for use in producing the upper body assembly is The Dow Chemical Co. Thermoplastic known by the trademark SAGRE TM.

The frame of the preferred embodiment is produced from fiber reinforced plastic and can be manufactured by an injection molded process. One material found satisfactory for the frame is The Dow Chemical Co. Thermoplastic known by the trademark ISO-PLAST TM. Other polymer materials, fillers or reinforcements and manufacturing means for such materials could be utilized. For example, structure-reaction-injection molded processes could be used with Dow Chemicals Spectrim (polyurethane), with or without mica filler.

By taking advantage of a net-shape manufacturing process, the opportunity to create attaching pivot points and bearing surfaces in the lower frame member of the structure is provided. Accordingly, no metal skeleton nor fabricated assembly is required, just a single lower frame member is satisfactory, thereby reducing the complexity of the assembly operation and cost.

Specifically included as molded-in elements in the frame structure of the present invention are engine and rear transaxle mounting structures, front wheel axle supports and steering linkage, transmission shift and park brake linkage supports and pivots, a battery support and restraint, battery cover mounting and pivot points, mower deck draft arm pivots and height adjustment structure supports, and part of the seat support and positioning structures. Additionally provided in the top body structure are seat support and adjustment structures which cooperate with the frame seat supports, steering shaft supports, and brake and clutch pivot supports. Between the two structures, that is the frame and top body, are provided mounts and guides for the brake and clutch control linkages.

Through utilizing plastic material properties, it is possible to integrate the aforementioned structural features into the frame and body parts and reduce manufacturing complexity, costs and difficulties.

The monocoque vehicle is designed to provide a durable, resilient vehicle chassis, reduce material expenses, manufacturing operations, and assembly procedures, yet facilitate quick and easy repair and maintenance activities.

BRIEF DESCRIPTION OF THE DRAWINGS

FIG. 11 is a schematic top view of the front wheel pivot support structure and rack and pinion steering mechanism for controlling front wheel orientation.

FIG. 12 is a front view of the structure illustrated in FIG. 11.

FIG. 14 is a schematic perspective view of the brake and clutch pedals, their pivot support, the control linkages and their guides.

FIG. 15 is an enlarged side view of the abutting connection between the brake pedal and its control rod, taken along lines 15—15 of FIG. 14.

FIG. 17 is an enlarged schematic side perspective of the shift control pivot supports and brake linkage connections.

FIG. 20 is an enlarged front elevated perspective of the frame and the height adjustment linkage for varying the deck height.

FIG. 21 is an enlarged front cut-away view of the seat and its mounting and adjustment structure on the assembly FIG. 22 is an enlarged view of the seat adjusting mechanism illustrated in FIG. 21.

DESCRIPTION OF THE PREFERRED EMBODIMENT

Figure 1:
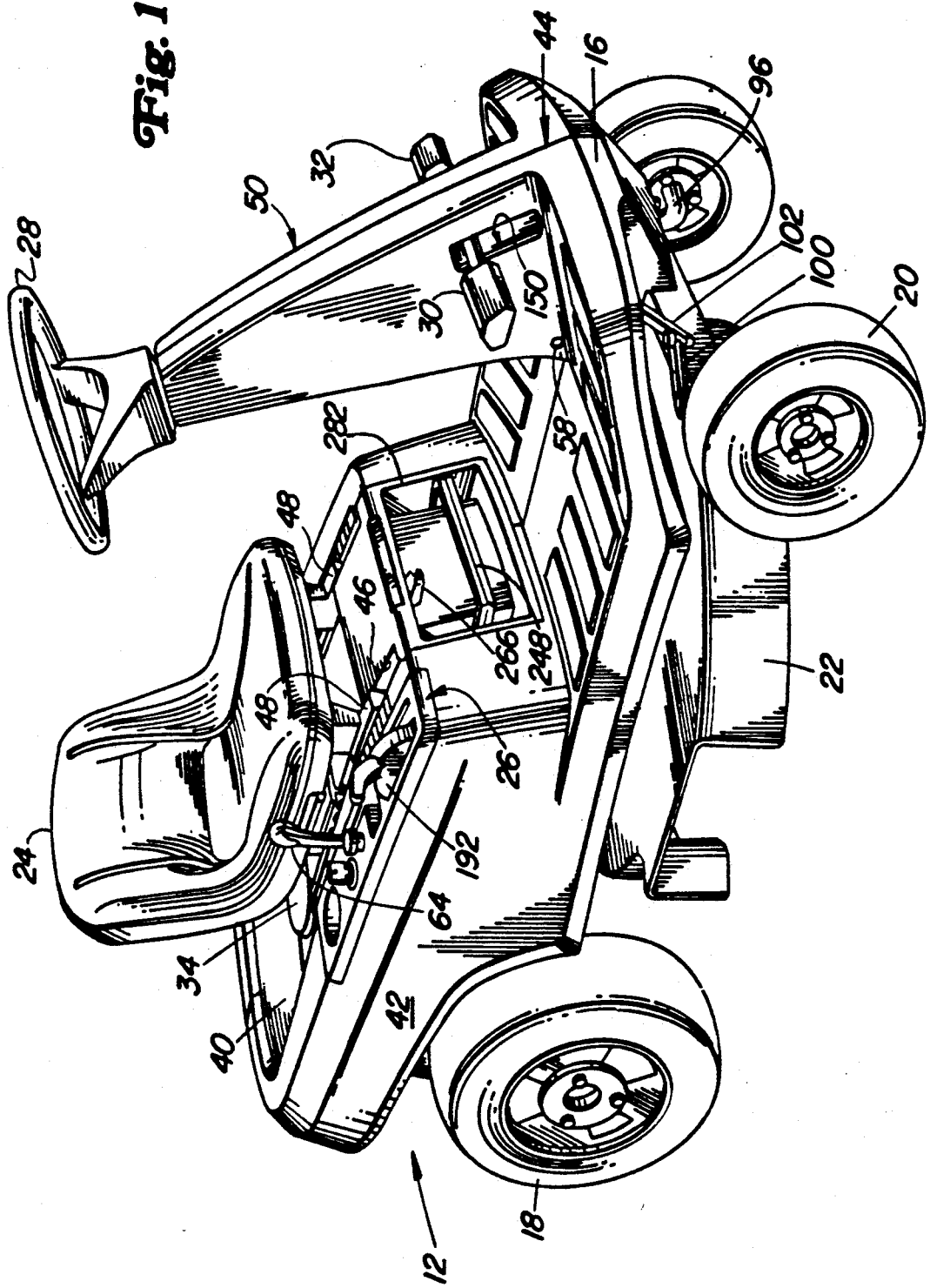
FIG. 1 is a front right elevated perspective illustrating a lawn and garden type vehicle which utilizes the monocoque body structure of the present invention.

Looking now to FIG. 1, there is illustrated a front right-side elevated perspective view of a lawn and garden vehicle 10 utilizing the plastic monocoque body assembly 12 of the present invention. As further shown in FIGS. 3 and 4, the vehicle 10 would include the body assembly 12 comprised of a plastic top shell 14 joined or bonded to a lower fiber reinforced plastic frame 16. The body assembly 12 is carried on rear and front wheels 18 and 20, the front wheels 20 being steerable. Further provided on the vehicle 10 is a mower deck 22, seat 24, shift control mechanism 26, steering wheel 28 and brake and clutch pedals 30 and 32.

Figure 2:
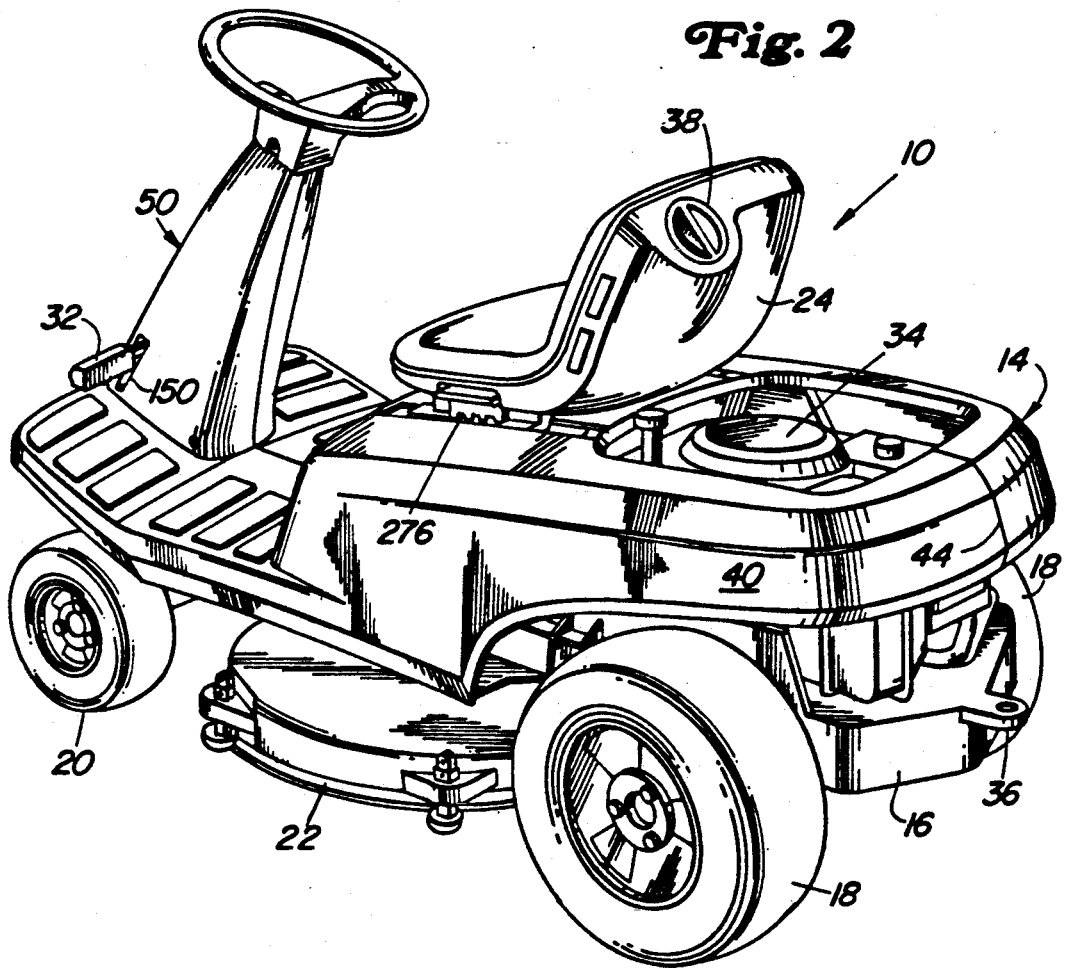
FIG. 2 is a rear elevated perspective of the vehicle and monocoque body assembly illustrated in FIG. 1.

FIG. 2 is similar to FIG. 1 but illustrates the lawn and garden vehicle 10 from the rear left elevated perspective. From this view, it is apparent that the engine, motor or power source 34 is mounted within the frame member 16 and in the opening provided at the rear of the frame 16 and body shell 14. A tow bar tongue 36 is provided on the frame 16 just to the rear of this opening and the engine 34. The seat has been modified to contain a fuel tank 38 with its cap being located at the top left side, away from the engine muffler and exhaust pipe.

Figure 3:
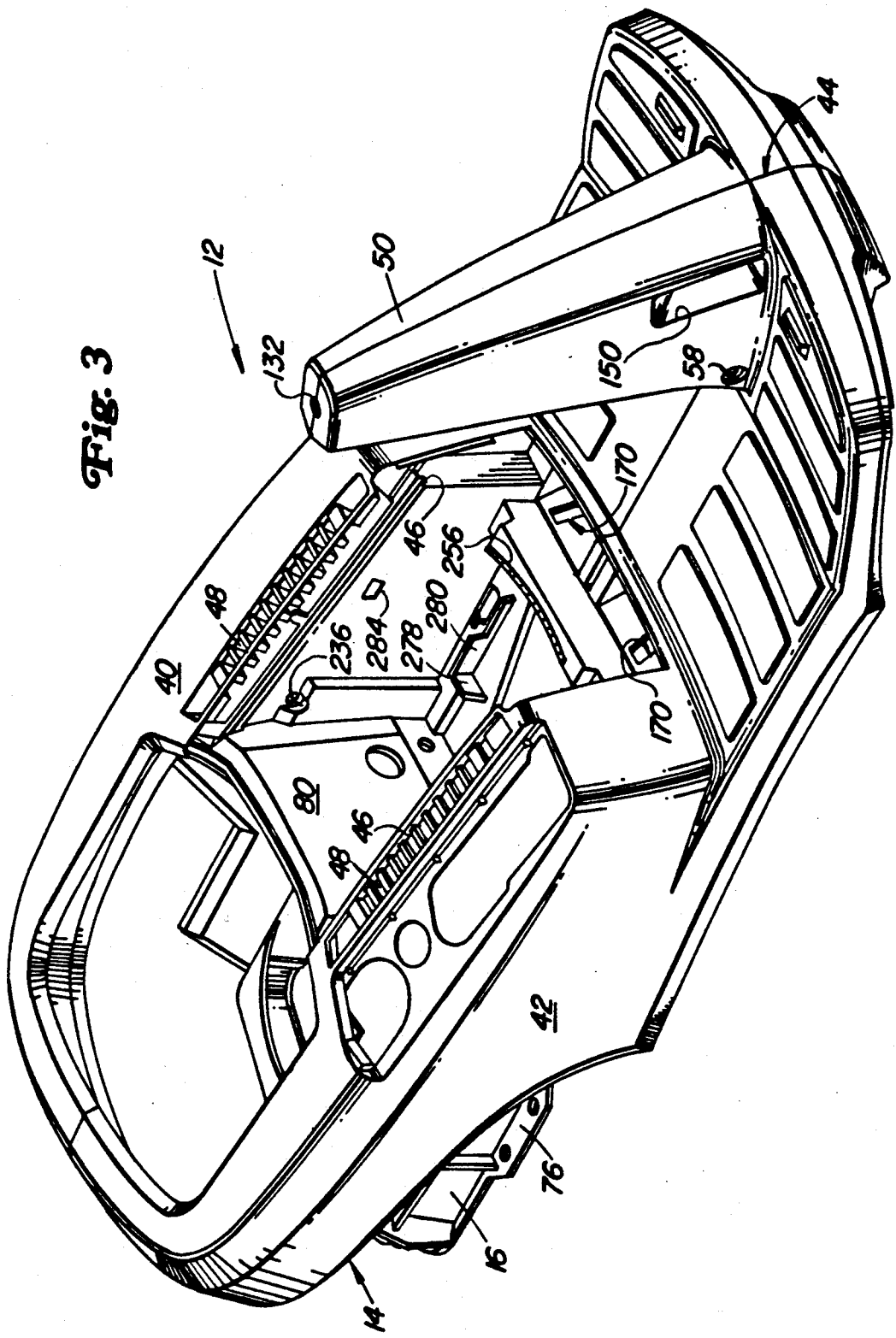
FIG. 3 is a front elevated perspective of the monocoque assembly including the body as joined with the lower frame section.
Figure 4:
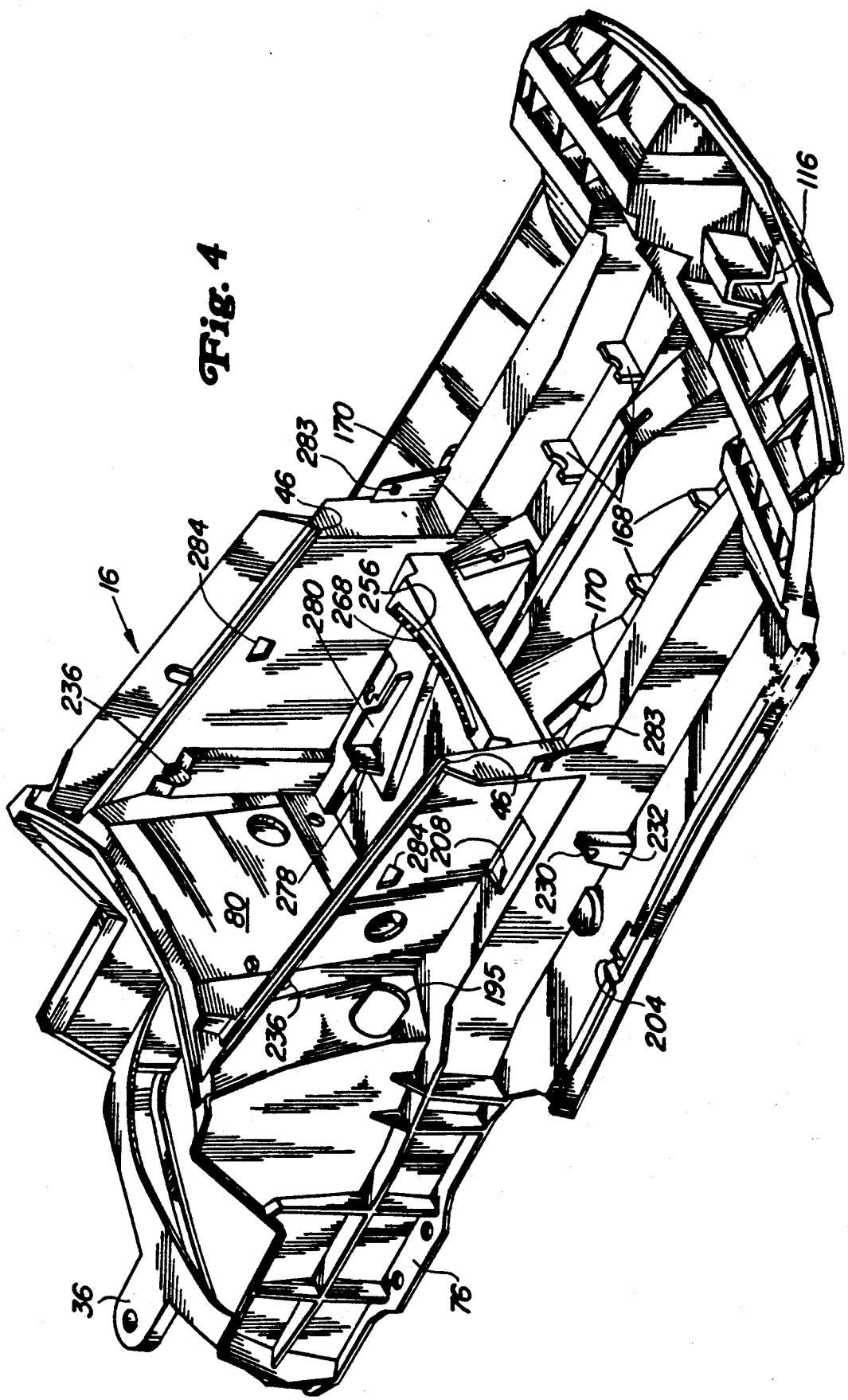
FIG. 4 is a front elevated perspective of the frame section utilized in the monocoque body assembly.

Turning now to FIG. 3, there is illustrated the monocoque body 12 including the top shell 14 which is composed of two plastic sections 40 and 42 joined along a fore-and-aft extending center line 44, those sections 40 and 42 being preferably bonded together prior to the top shell 14 being joined with the lower frame 16. As illustrated in FIG. 4, the frame 16 includes a centrally located three-sided compartment. This compartment houses the battery and mower deck height adjusting mechanism Additionally provided at each fore-and-aft extending side of the compartment are channels 46 upon which the seat 24 would ride and notches 48 upon which a seat adjustment mechanism would be used to selectively position the seat 24 closer and/or further away from the steering column 50. These features are better illustrated in FIGS. 20, 21 and 22.

It is the plastic body assembly 12 of FIG. 3 which replaces the traditional frame provided for lawn and garden tractors and to which the components of the vehicle are attached and supported.

Figure 5:
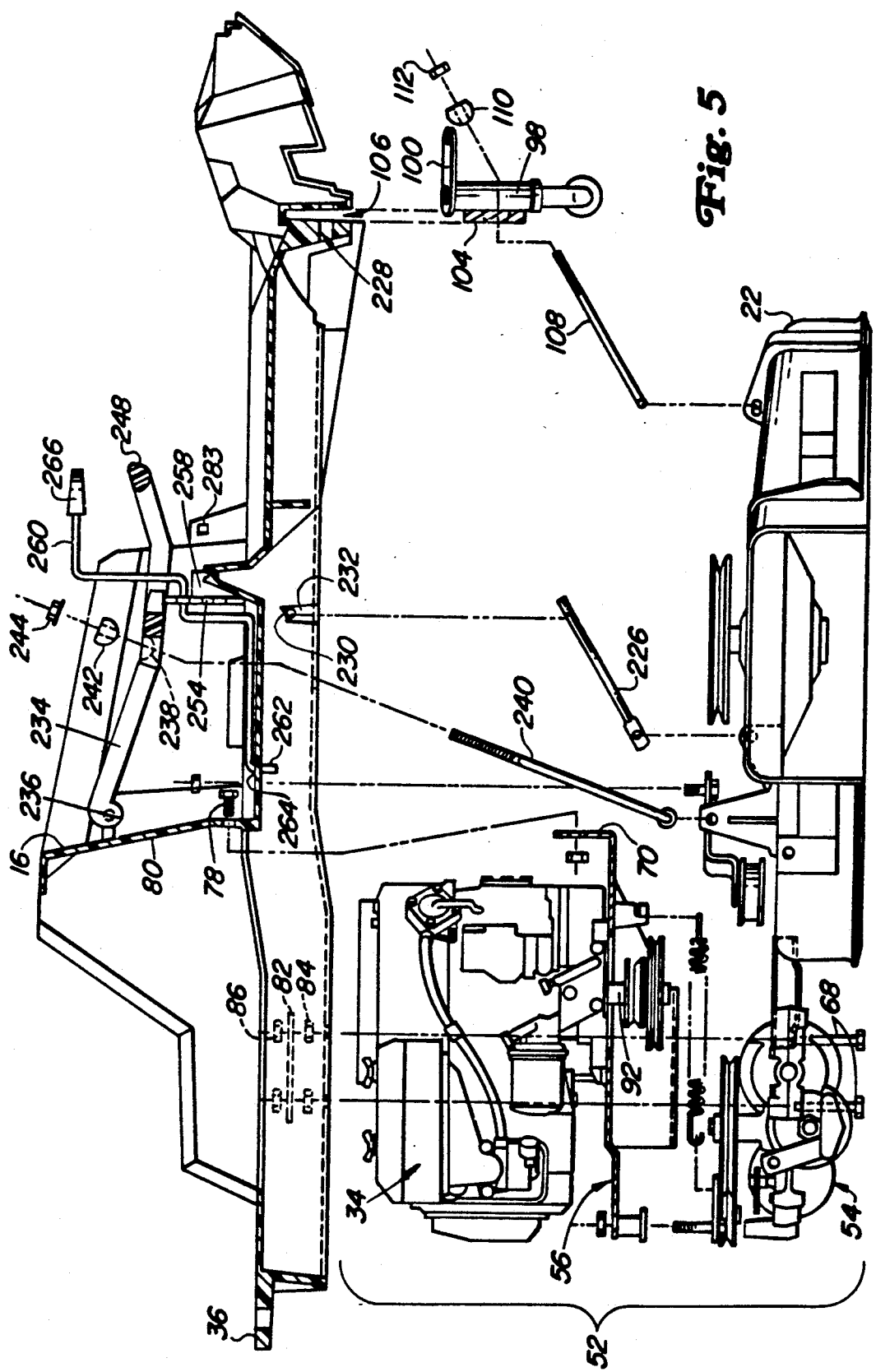
FIG. 5 is an exploded side view of the engine, transaxle and mower deck components with the frame illustrated in sectional view.
Figure 6:
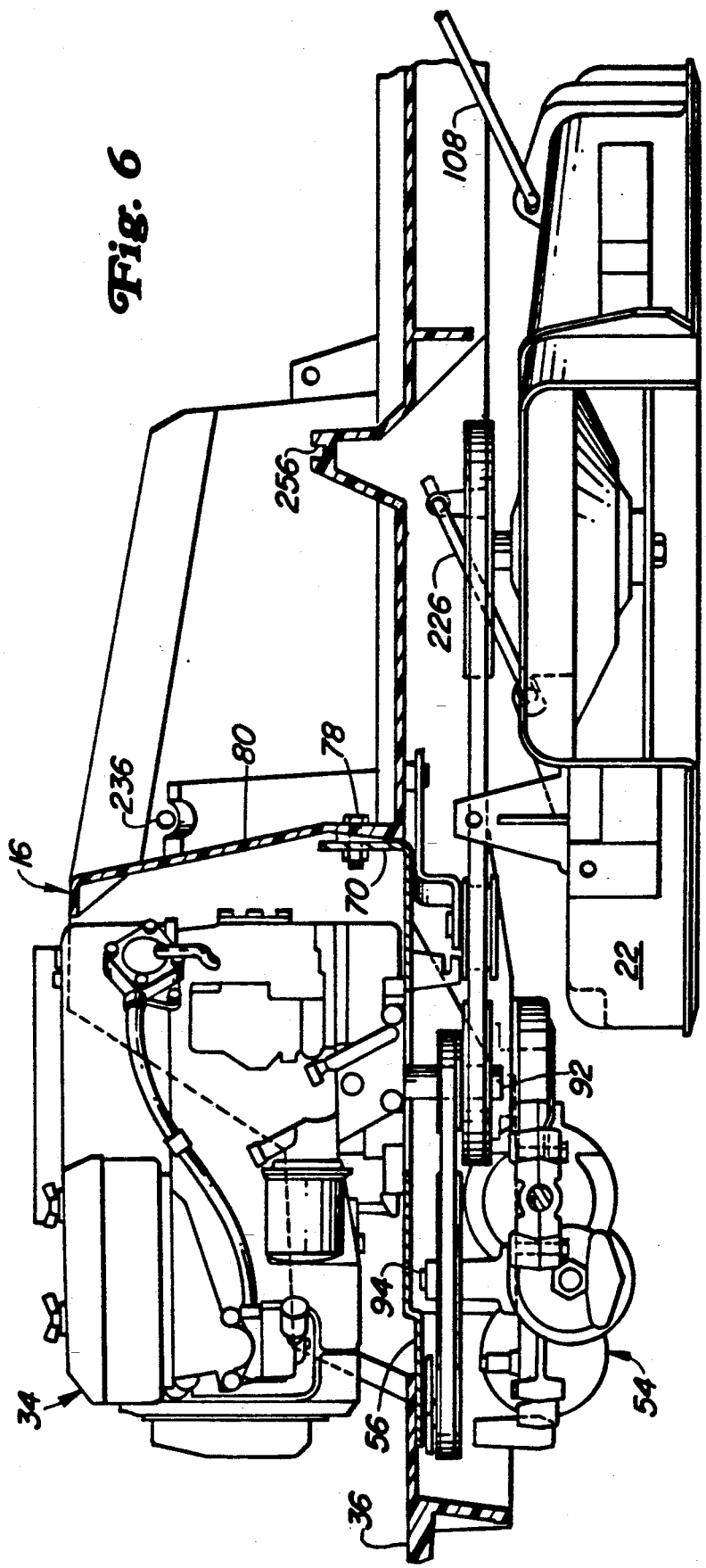
FIG. 6 is a slightly enlarged side view of the assembly illustrated in FIG. 5 with the engine, transaxle and mower deck mounted to the frame.
Figure 7:
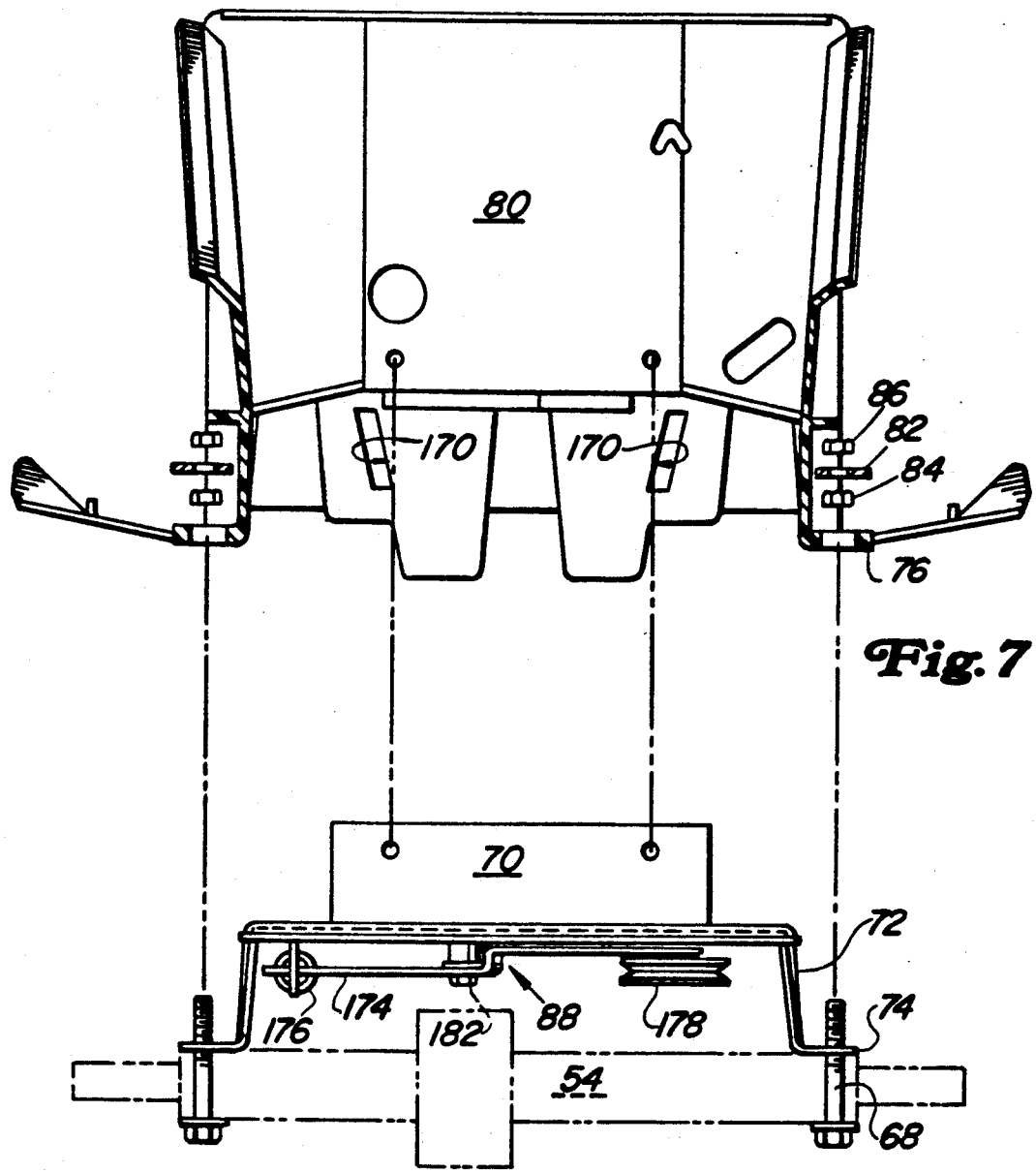
FIG. 7 is an enlarged and exploded sectional rear view of the frame and plate upon which the engine and transaxle are mounted, the transaxle being illustrated in phantom lines and the engine being deleted therefrom.
Figure 16:
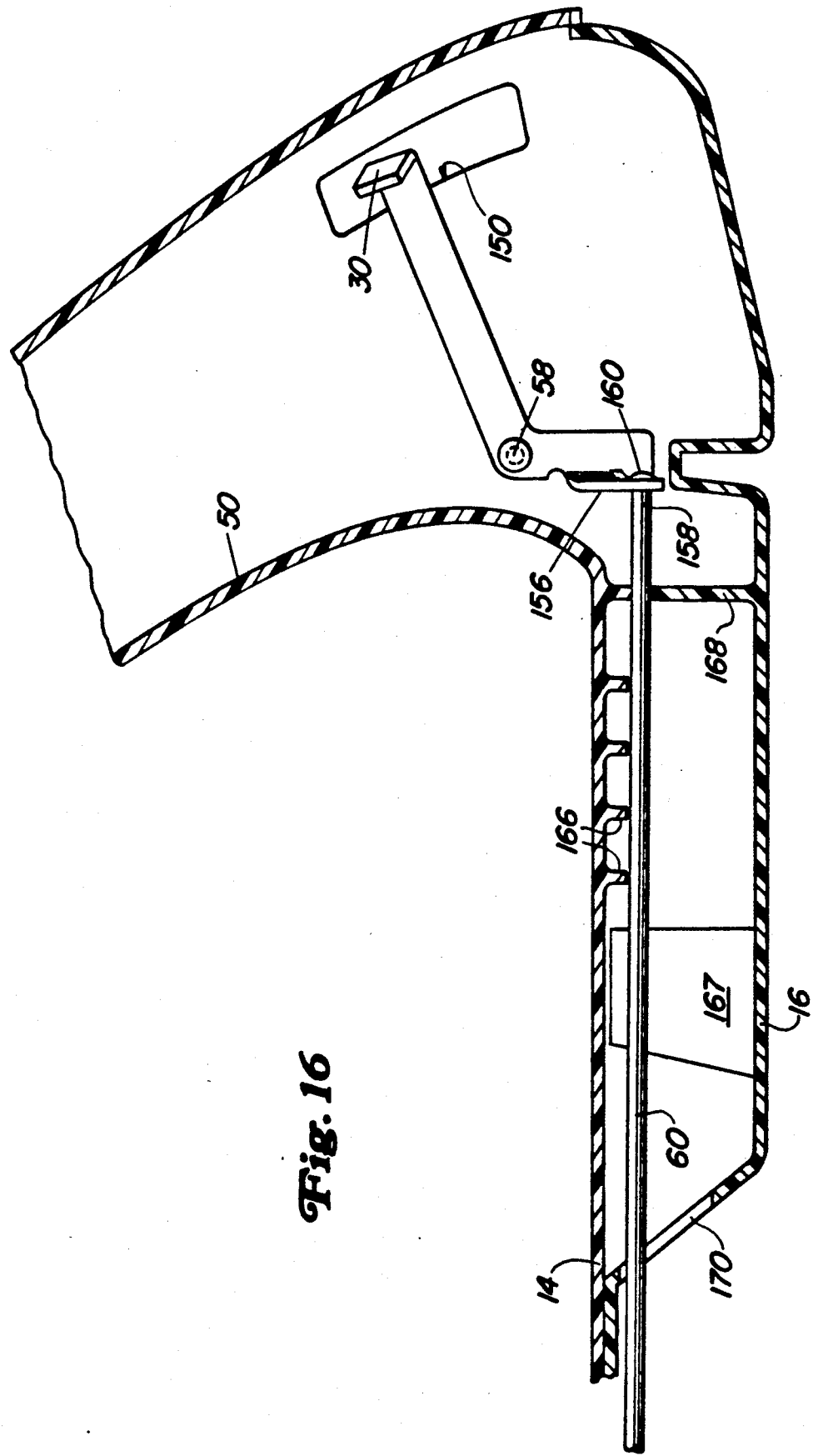
FIG. 16 is an enlarged side view of the brake support structure, its control link and guides.
Figure 19:
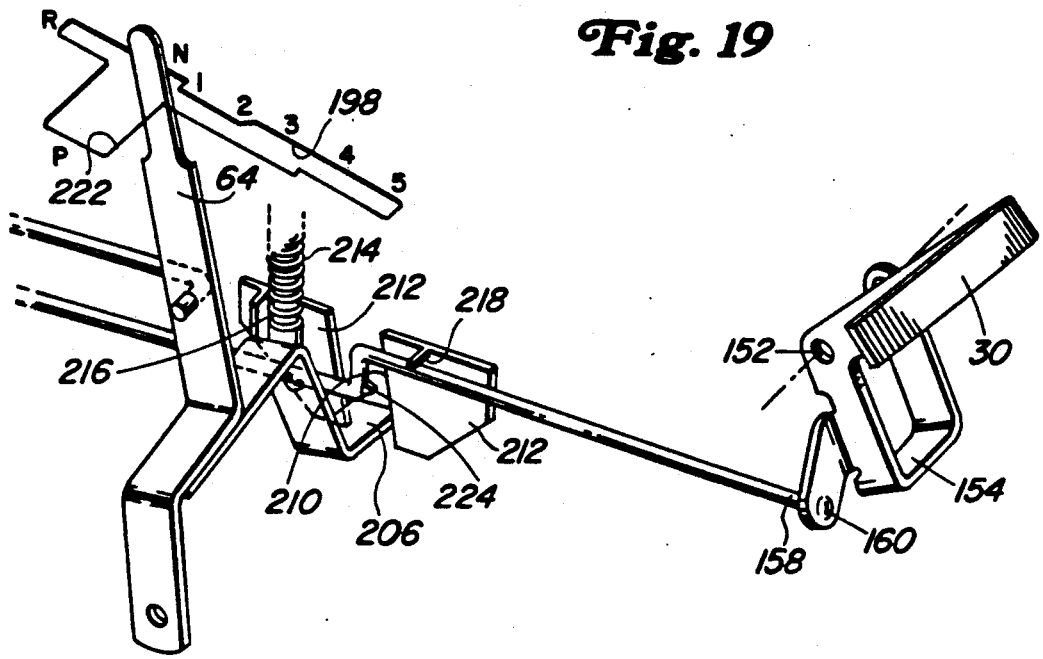
FIG. 19 is a view similar to that illustrated in FIG. 18 but illustrating the shift control in the neutral position wherein the brake can be actuated.

Specifically, to the body assembly 12 would be mounted the engine-transaxle module 52, which is illustrated in an exploded view in FIG. 5 and assembled in FIG. 6, the module 52 including the engine 34 and transaxle 54 mounted to the plate 56 which is illustrated in FIG. 7. It is also to this body and frame assembly 12 that the front wheels 20, and their support and steering structure would be mounted, those components and their relationship to the body assembly 12 being illustrated in FIGS. 10, 11, 12 and 13. Further, the brake and clutch pivot support 58 and their respective control linkage structures 60 and 62 would be assembled to the body assembly 12. The linkages 60 and 62 are best illustrated in FIGS. 14, 15 and 16. To this assembly 12 the combination gear shift lever and parking brake 64 would also be assembled. The lever 64 and its associated structure are best illustrated in FIGS. 17, 11 and 19. A mowing implement or deck 22 can also be supported below the vehicle 10 and connected to the body and frame assembly 12 as illustrated in FIGS. 1 and 2. The mower deck lift linkage 66 and height adjustment 68 for the deck 22 are best illustrated in FIGS. 5 and 20. It is also to this body and frame assembly 12 that the seat 24 would be mounted and slidably adjusted, as best illustrated in FIGS. 3, 4, 21 and 22.

ENGINE-TRANSAXLE MOUNTING TO FRAME

Looking first to FIG. 5 and the cut-away frame 16 which is designed to support the engine transaxle module 52, there is shown in exploded fashion the mower deck 22, the engine or other vehicle power source 34, the transaxle 54, and the mounting plate 56 to which the engine 34 and transaxle 54 are secured by bolts 68. The plate 56 with the engine 34 and transaxle 54 first mounted thereto is secured to the frame 16 as a unit. The mounting structure for securing the module 52 to the frame 16 is further illustrated in FIGS. 6, 7, 8 and 9.

The module plate 56 is generally flat with an upstanding forward leg 70 and downwardly extending L-shaped legs 72 on each side (see FIG. 7). The side legs 72 include out turned flanges 74 which are adapted to secure the transaxle 54 to the plate 56 and to the outwardly extending flanges 76 provided on the frame 16 (see FIGS. 7 and 8). As best illustrated in FIGS. 7 and 9, four bolts 68, two on the left and two on the right side of the plate 56, mount the transaxle 54 to the plate 56 and frame 16. Further securing the module plate 56 to the frame 16 are two fore-and-aft extending bolts 78 which pass through the upstanding forward wall 70 of the plate 56 and are secured to the rear wall 80 of the seating compartment of the frame 16 (see FIGS. 4, 5, 6 and 7). The engine transaxle module 52 and its mounting plate 56 permit quick and easy assembly of the engine 34 and transaxle 54 to or from the frame 16.

Figure 8:
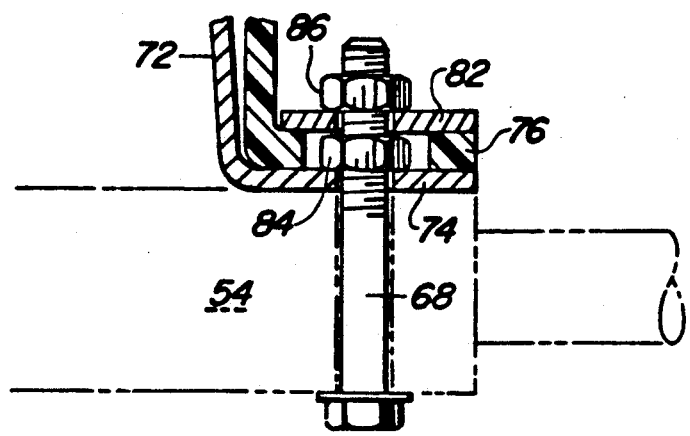
FIG. 8 is an enlarged view of the connection between the plate and frame illustrated in FIG. 7.
Figure 9:
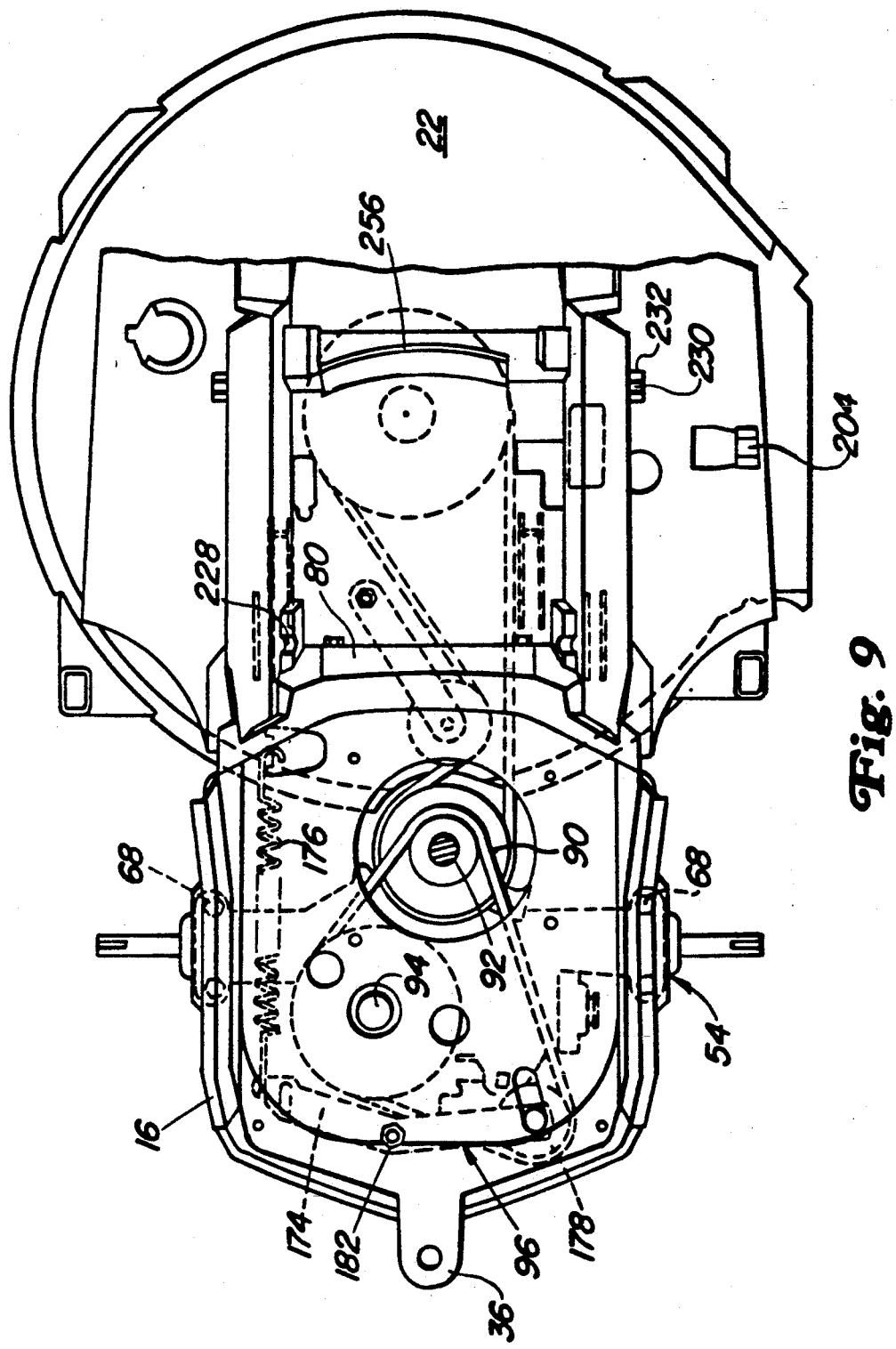
FIG. 9 is a top partial view of the frame with the engine transaxle assembly and deck assembled thereto.

To mount the relatively heavy engine transaxle combination 52 to the flanges 76 of the fiber reinforced plastic frame 16 so as to minimize the creep or flow of the plastic material at the connection, there is provided the means for attaching illustrated in FIGS. 7 and 8. This arrangement provides for the plastic frame ledge 76 to be sandwiched between the flange 74 of the plate 56 and another metal member 82 with a nut 84 serving as a spacer to limit compression on the frame ledge 76. As shown best in FIG. 8, bolts 68, which support the transaxle and engine module 52 from the frame 16, pass through the flange 74 of the module plate 56, the frame flange or ledge 76 and the second plate member 82 with the nut 84 serving as a spacer between the metal leg 74 and plate 82 to limit the compression forces encountered by the frame 16. A second nut 86 is then used to secure the module 52 to the frame 16.

The module plate 56 in the preferred embodiment further includes the belt tightening pulley 88 around which the belt 90 is trained to transmit power from the engine drive shaft 92 to the transaxle input shaft 94 (see particularly FIGS. 7, 9 and 14).

FRONT WHEEL SUPPORT AND STEERING ATTACHMENTS

Returning now to FIG. 1, it is noted that the vehicle 10 is provided with steerable front wheels 20 and a steering wheel 28 at the top of the column 50. These structures and their connections to the frame 16 and top shell 14 are illustrated in detail in FIGS. 10, 11, 12 and 13.

Figure 10:
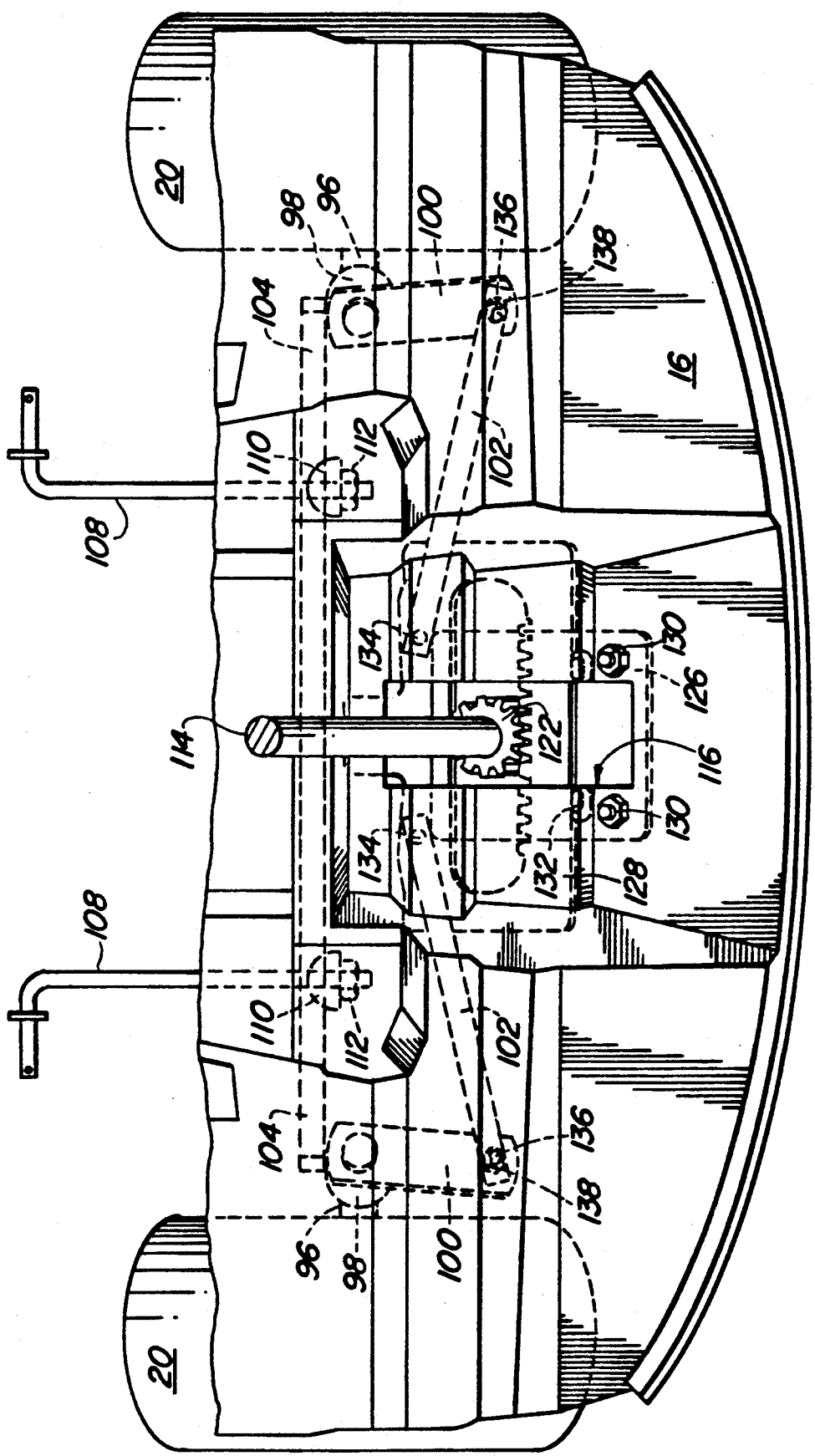
FIG. 10 is a enlarged top and partial view of the frame with the front wheel steering pivot supports and vehicle steering linkage illustrated in dotted lines.

Looking first to FIG. 10, there is illustrated an enlarged plan view of the frame 16 and steering wheels 20 with the wheel axles 96, their pivot supports 98, crank arms 100 and links 102 illustrated in dotted lines. This structure is more clearly illustrated in FIGS. 11 and 12, with a side view of the pivot support 98, crank arm 100 and steering link 102 further illustrated in FIG. 13.

The wheels 20 are carried on respective L-shaped axles 96 (see FIG. 12) which in turn are swingably carried within a pivot support or sleeve designated 98. Each pivot structure 98 is supported on a transversely extending bar 104 which in turn is received within U-shaped channels 106 formed in the bottom section of the frame 16 (see FIGS. 5 and 13). The forward pair of mower deck lift linkage elements 108 pass through and are secured to this cross bar 104 with semi-spherical spacers 110 and nuts 112. This connection permits oscillatory motion of the front draft links 108 with respect to the cross bar 104.

Figure 13:
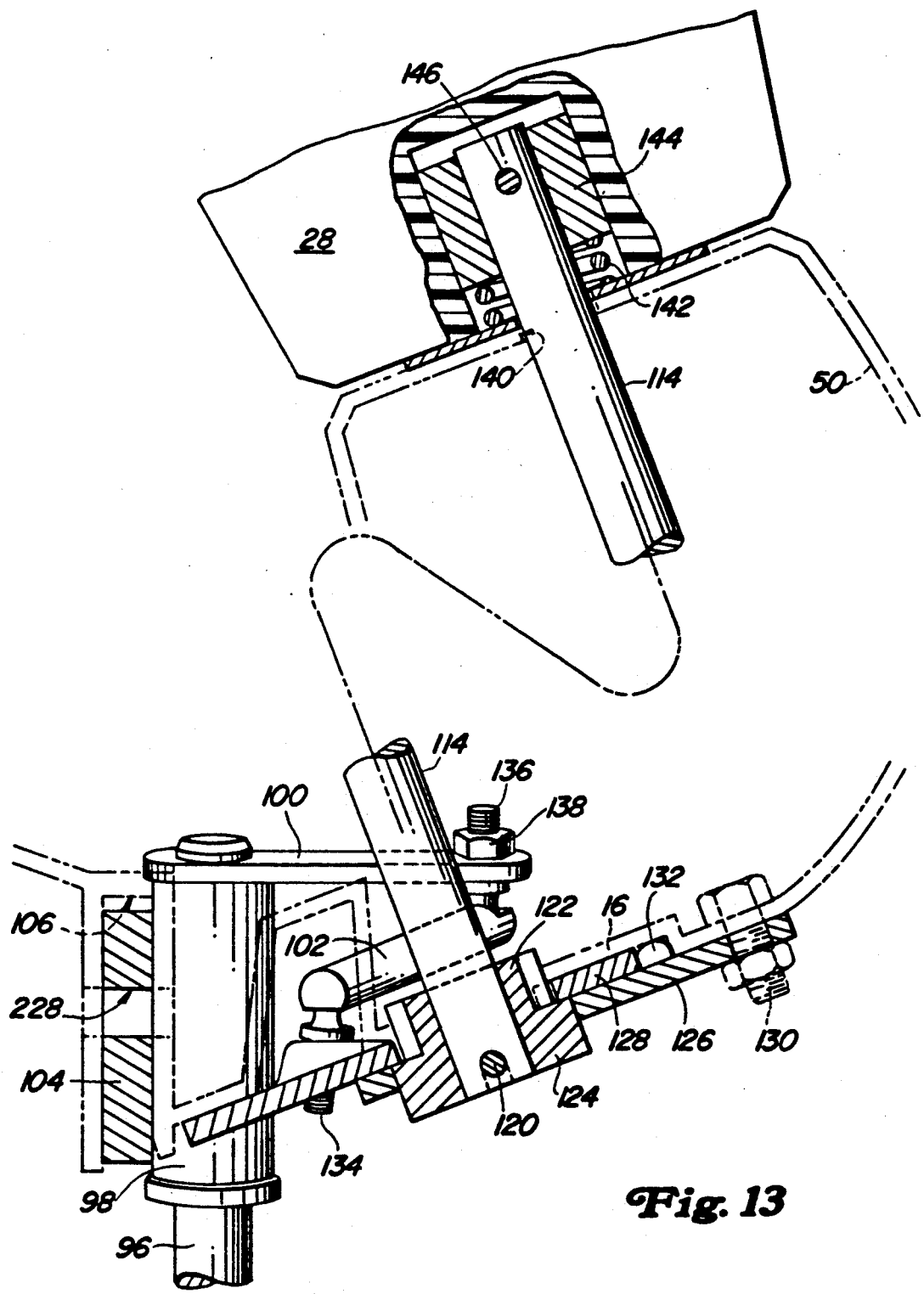
FIG. 13 is an enlarged and side view of the steering wheel pivot and support structure as well as the steering wheel shaft used for controlling the orientation of the wheels.

Returning again to FIGS. 1 and/or 2, it is noted that the steering wheel 28 is provided atop the steering column 50 for controlling the orientation of the front wheels 20 of the vehicle 10. The steering wheel 28 in turn is connected to the shaft 114 (see FIG. 13) which extends through the steering column 50, and projects through the opening 116 in the frame 16 (see FIGS. 4 and 10). The shaft 114 carries at its lower end a single member 118 fixedly attached thereto by means of a pin 120 (FIGS. 12 and 13). The member 118 includes at its top portion a gear 122 and at its lower portion a disklike bearing 124 which abuts at its top surface a guide plate designated 126.

A rack and pinion steering mechanism is provided for steering the front wheels 20 and includes the guide plate 126 which forms the support for back and forth movement of the rack 128. As best shown in FIGS. 10, 11 and 12, the rack 128 and its guide plate 126 are supported by the lower frame 16, the guide plate 126 being fixed thereto by two bolts designated 130. At the forward end of the guide plate 126 are two upstanding guide projections designated 132, against which the forward edge of the rack 128 is restricted against forward movement and is guided in its transverse movement as the steering column shaft 114 and its gear 122 is rotated to move the rack 128 back and forth. The rack 128 in turn is connected with the left and right steering links 102 by bolts 134 or similar means, the steering links 102 being in turn connected to their respective wheels axles 96 by arms 100 which are coupled to the links 102 by bolts 136 and nuts 138.

Assemblage of the rack and pinion steering mechanism to the lower frame 16 would proceed through first attaching the cross bar 104, with the L-shaped axles 96 and arms 100 assembled thereto, to the frame 16 by inserting the bar 104 into the channels 106 formed in the frame 16 (see FIGS. 5, 11 and 13). The rack 128 would then be bolted to the left and right links 102 and then this assembly would be placed against the frame 16, the plate 126 then positioned beneath the rack 128 and bolted to the frame 16 to secure the rack 128 and plate 126 in place. Then the left and right steering links 102 would be connected to left and right arms 100. The steering shaft 114 would then be pinned to the member 118 by pin 120, sequentially inserted through the plate 126, the rack 128 and then the opening 116 in the frame 16, up in through the steering column 50 and pass out the opening 140 at the top of the steering column 50. The spring 142 would then be installed on the steering shaft 114 to preload the shaft 114 to eliminate play and the spacer or steering wheel hub 144 would be installed on top of the spring 142 with the pin 146 being installed through the shaft 114 and spacer 144 to secure the shaft 114 in place.

BRAKE AND CLUTCH PIVOTS AND LINKAGE

The plastic monocoque body assembly 12 has formed therein the pivot support 58 for the brake and clutch pedals 30 and 32, as well as guides 148 for the linkages 60-62 passing from the brake and clutch pedals 30 and 32 to the transmission and brake controls (see particularly FIGS. 3, 14, 15 and 16).

The brake and clutch pedals 30 and 32 project through respective access openings on each side of the steering column 50, those openings being designated 150. A pivot pin 58 supports the brake and clutch pedals 30 and 32 in the steering column 50 for swinging movement The pin or shaft 58 extends through the opening 58 in the steering column 50 and passes through the holes 152 in the pedals 30 and 32. As illustrated in FIG. 14, the pedals 30-32 are essentially mirror images of one another and each include a U-shaped support structure 154 which can be slipped through the opening 150 in the assembled steering column 50 and positioned for insertion of the rod or pivotal support 58 through the column 50 and openings 152 provided in each of the two pedals 30-32.

The pedals 30-32 in turn each include a laterally extending arm 156 against which is abutted the end 154 of each control linkage 60-62 (see FIG. 15). Each control linkage 60-62 has a rounded end 158 which seats into a recess 160 formed in the pedal arm 156. Compression spring 162 is provided on the end of linkage 60 to limit the brake force applied to the brake arm 186. Spring 164 is provided at the end of arm 172 to assist in tensioning the belt 90. Spring means 190 and 176 respectively bias the linkages 60 and 62 toward their respective pedals 30-32, thereby maintaining the linkages 60-62 in contact with the pedal arms 156 (see FIG. 14).

Serving as guides 148 for the respective brake and clutch control linkages are mating U-shaped tabs 166 and 168 which project respectively from the body and frame surfaces (see FIGS. 14 and 16).

Serving as a passageway for the control rods 60-62 through the frame 16 are the access openings 170 (see FIGS. 4, 16 and 20). At their respective rear ends the control linkages 60 and 62 each are connected to their respective brake and/or clutch control devices.

Looking first to the clutch control device, it will be noted that the control linkage 62 has a down turned end 172 which passes through an opening in the belt tightener arm 174 and is secured thereto by a spring 176 which assists spring 164 in biasing both the arm 174 and the linkage 62 towards the front of the vehicle 10. The rounded end 158 of the linkage 62 is thus biased into the recess 160 on the clutch pedal arm 156. The clutch arm 174 is pivotally supported at its center portion and serves to swing the pulley 178 about the axis 180 which passes through the pivot support 182. As the pulley 178 is rotated toward and away from the engine drive shaft 92, the belt 90 will be untensioned and then respectively tensioned. Accordingly, the springs 164 and 176 bias the arm 174 in a clockwise direction as viewed in FIG. 14, to tension the belt 90 and maintain the drive in an operative condition until the clutch pedal 32 is depressed.

Looking now to the brake control linkage 60, it is noted that the rearward end thereof passes through a pin 184 mounted in the brake arm 186. A compression spring 162 abuts at its forward end a washer 188 carried on the linkage 60 and at its rearward end the pin 184 carried on the brake arm 186 to preload the linkage 60 towards the forward end of the vehicle 10. A second spring 190 is connected to the brake arm 186 and a location on the transaxle 54 to bias the brake arm 186 forwardly, the brakes out of engagement and the brake control linkage 60 forwardly. As is the case with the clutch linkage 62 and its pedal 32, the brake control linkage 60 abuts the brake pedal arm 156 to force the pedal 30 counterclockwise as viewed in FIG. 14 about the pin 58.

Assembly of the brake and clutch pedals 30 and 32 to the body assembly 12 illustrated in FIG. 3, and their control linkages 60-62 can proceed after the engine transaxle module 52 has been installed in the assembly 12 The linkages 60-62 would be inserted from the bottom, and rear area of the assembly 12, through the access openings 170 in the frame 16, through the guides 148 provided between the tabs 166 and 168 towards their respective clutch and brake pedal arms 30 and 32. The spring 162, washer 188 and pin 184 would have been preassembled first. The brake pedal 30 and clutch pedal 32 would have been inserted through the openings 150 in the steering column 50 (see FIG. 3) with the pivot shaft 58 passing through the steering column 50, openings 152 in the brake and clutch pedals 30 and 32. As the brake and clutch rods 60 and 62 are advanced, their respective rounded ends 158 abut the rounded surfaces 160 in the respective brake and clutch arms 156. The connections between the rear end of each linkage 60-62 and their respective control arms 174 and 186 would then be made and the springs 164, 176 and 190 installed.

GEAR SHIFT AND PARKING LEVER

FIGS. 1, 17, 18 and 19 best illustrate the gear shift and parking lever mechanism.

As shown in FIGS. 1 and 3, the right side of the monocoque body assembly 12 carries a control module 26 through which the gear shift and parking lever 64 projects Additionally provided in this control module 26 is an accelerator lever designated 192.

Looking first to FIG. 17, there is shown a generally Z-shaped control link or rod 194 which extends between the parking lever 64 and the transmission shift arm 196. As best shown in FIG. 20, this rod 194 passes through the opening 195 in the lower frame member 16 to connect with shift arm 196. As the lever 64 is moved forward along the slot 198 carried in the control module between the positions of "R", "N" and "1", "2", "3", "4", "5", it moves the rod 194 and transmission arm 196 to shift the transmission gear arrangement in a conventional fashion.

The gear shift lever 64 also serves as a parking brake through its structural interconnection with the brake control linkage 60. At its lower end, the gear shift lever 64 is U-shaped and includes a first leg 200 which carries at one end a pivot bolt 202 that mounts in the opening and seat 204 formed in the frame 16 (see FIG. 4). The seat 204 in the frame 16 secures the bolt 202 for fore-and-aft movement about an axis through the bolt 202.

A second leg 206 is connected to the parking and shift lever 64 and extends downwardly through the frame opening 208 (see FIG. 4). This leg 206 projects between a channel or guide 210 formed between two tabs 212 which extend downwardly from the frame 16 (see FIGS. 17, 18 and 19). A spring 214 is connected with the lever arm 64 to bias it transversely and urge the second L-shaped leg 206 of the shift lever 64 upwardly within the guide 210. The laterally extending members 216 and 218 serve to restrict upwardly movement of the linkage 60 as the spring 214 urges the leg 206 and linkage 60 upwardly.

Figure 18:
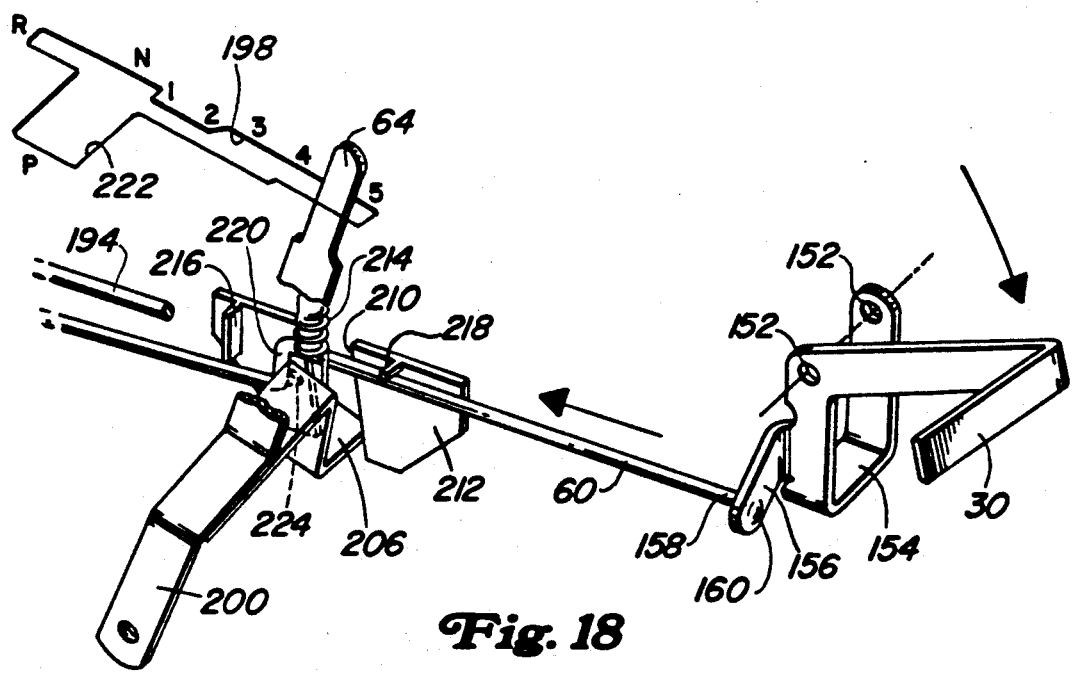
FIG. 18 is an enlarged schematic view of the shift control pivot supports and brake linkage connections illustrating the shift control in the gear engaged position wherein the brake may be actuated.

The cooperation between the second L-shaped leg 206 of the shift lever 64 and the Z-shaped brake control linkage 60 provides for the shift lever 64 to lock the brake linkage 60 in its engaged position and serve as a parking brake. To engage the shift lever 64 in its parking brake configuration, the operator would first be required to move the shift lever 64 to the neutral position to disengage the transmission and then push the brake pedal 30 down, as illustrated in FIG. 18, to move the rod 60 to the rear. As the vertical leg 220 of the control rod 60 is moved rearwardly of the leg member 206, the shift lever 64 is urged upwardly within the channel 210 by the biasing means 214 and thereby moves in front of the vertical leg 220 of the control rod 60. Concurrently, the shift lever 64 moves transversely towards the parking brake opening 222 of the control module 26 (see FIG. 17).

At the lower edge of the vertical leg 220 of the control rod linkage 60 is a tab or knob 224 provided to prevent slippage of the shift lever leg 206 from its engagement with the vertical leg 220 and inadvertent disengagement of the lever 64 from its parking brake setting. To disengage the parking brake lever 64, the operator would have to push the brake 30 down to shift the rod 60 rearwardly and the tab 214 out of engagement with the vertical face 220 of the control linkage 60 to thereby allow the shift lever 64 to be moved transversely toward the neutral designation on the control module 26. Thereafter the brake pedal 30 can be released and the springs 162 and 190 Will urge the rod 60 forwardly.

MOWER DECK LIFT LINKAGE AND HEIGHT ADJUSTMENT

The mower deck lift linkage and height adjustment mechanisms are best illustrated in FIGS. 5, 6, 10 and 20.

Looking first to FIG. 5, it is noted that the mower deck 22 includes front and rear lift linkages designated 108 and 226. In this side view only two are shown; however, counterpart linkages would be provided at the far side of the mower deck 22, thereby providing for the deck 22 to be lifted by a pair of parallel spaced forward and a pair of parallel spaced rearward lift linkages.

The forward lift linkages 108 are connected to the steering cross bar 104. As illustrated in FIGS. 5 and 10, the forward ends of the linkages 104 are threaded, pass through openings 228 provided in the cross bar 104 (see FIG. 13) and are secured thereto with hemispherical adjusters or spacers 110 and nuts 112 (see FIG. 5). Accordingly, the mounting means permits oscillation of the forward links 108 about their support with the cross bar 104 and leveling adjustment of the mower deck 22.

Rearwardly spaced lift links 226 are also provided to form a four-bar linkage for supporting the mower deck 22. These L-shaped links 226 include a leg at the upper end which is seated in the opening and support 230 formed in the frame 16 (see FIGS. 4, 5 and 6). The top L-shaped portion of the link 226 is inserted through the opening 230 and rests on the support 232 formed in the frame 16 to permit a swinging motion of the link 226 as the deck 22 is raised and lowered.

Looking now to FIG. 20 which best illustrates the height adjustment structure 68 provided for the deck 22, there is shown a pair of fore-and-aft extending transversely spaced lift arms 234 which are pivotally supported at their rearward ends in the openings or radiused shelves 236 provided in the frame 16 (see also FIGS. 4 and 6). The arms 234 are prevented from moving off the shelves 236 by bosses carried on the arms 234. At the mid-portion of the arms 234 are provided triangularly-shaped openings 238 through which the mower lift links 240 extend. The links 242 pass through the hemispherical spacers 242 which permit oscillation of the lift links 240 within the mounting on the lift arms 234 and are secured by nuts 244. The laterally spaced arms 234 are joined by a first cross member 246 and a second forwardly spaced cross member 248 which serves as a handle.

The mower deck height adjustment linkage 66 is best illustrated in FIGS. 5 and 20 and includes the forwardly projecting tab 250 which is mounted to the rearward cross bar 246. This tab 250 is adapted to engage and rest upon one of the steps 252 provided on the transversely slidable height adjustment member 254. The height adjustment member 254 is transversely slidable within and along the slot 256 provided by a pair of concentric ribs in the lower frame 16 by virtue of the forwardly projecting pair of legs 258 which are seated in the slotted guide 256. Fixed to and projecting through the height adjustment member 254 is the rod 260 which has its rear end 262 pivotally seated in an opening 264 formed in the frame 16 (see FIGS. 5 and 20) and its forward end connected with the handle 266 which projects through the vehicle frame 16 just forwardly of the seat 24 for movement by the operator (see FIG. 1).

To adjust the height of the mower deck 22, the operator would pull up on the handle 248, which would in turn raise the lift arms 234 and, due to the four-bar parallel linkage arrangement of the mower links 226-108, raise the front and rear portions of the deck 22 correspondingly. The operator would then slide the stepped height adjustment member 254 left or right to appropriately raise or lower the deck 22. The height of the deck would be adjusted as the tab 250 carried on the cross bar 246 would be moved from one step 252 to another on the height adjustment member 254 as it is shifted beneath the tab 250. The handle 248 would then be lowered to seat the tab 250 on one of the steps 252.

Also provided along the top of the ribs forming the channel 256 are notched surfaces 268 for incrementally moving the height adjustment member 254 along the channel 256 and seating it between those raised surfaces 268, which thus serve as detents.

SEAT SUPPORT AND ADJUSTMENT MECHANISM

The seat support and adjustment mechanism is best illustrated in FIGS. 3, 4, 20, 21 and 22.

As illustrated in FIG. 20, the fore-and-aft seat supporting channels 46 are provided on each side of the lower frame 16. These channels 46 are shown in an end view in FIG. 21 with the legs 270 of the seat resting therein. The upper body member 14, when joined with the frame 16, has a projecting flange 272 which overlaps and abuts the wall 274 of the frame. These two walls, that is the wall of the body 272 and the wall of the frame 274, once bonded, serve as lateral support for the seat legs 270 with the fore-and-aft channels 46 in the frame 16 serving as the slide and the retaining structure for maintaining the seat 24 in a selected fore-and-aft position.

To secure the seat 24 in a specific position along its slide 46, there are a series of notches 48 provided in the upper body 14 (see FIGS. 3 and 21) within which flexible tabs 276 formed in the seat 24 rest to locate the seat 24 relative to the vehicle 10. These locking seat tabs 276 are formed in the seat structure and are actuated by the operator raising them as is illustrated in the left side of FIG. 21 and then allowing them to be seated in a notch 48 to position the seat.

BATTERY SUPPORT

Looking now to Fibs. 3, 4 and 20, there is illustrated the compartment area above which is mounted the seat 24. In this compartment area, a battery can be housed with the upstanding walls 278 and 280 formed in the frame 16 providing a restraining seat. Similar walls (unshown) are formed on each side of the compartment and can be provided at the front portio of the compartment if desired. The battery cover 282 (FIG. 1) is provided to enclose the front portions of the compartment and it can be provided with ribs or similar means to secure the top portion of the battery in place. Similarly, this cover 282 can be pivotally mounted to the sides of the compartment at 283 (FIGS. 4 and 20) and be provided with flexible tabs formed therein which snap lock in the openings 284 (see FIGS. 3 and 4).

From the foregoing description, it is seen that the lower frame is formed to provide attaching, pivoting and guide structures for accommodating the engine, transaxle, forward wheels, steering, brake, clutch, speed control, parking brake, steering and seating structures and mechanisms for the vehicle. The body as joined with the frame additionally serves to provide the seating and adjustment structure, as well as house the brake and clutch pedals and their control linkages.

From the foregoing, it is seen that a monocoque body is provided which substantially reduces the number of parts and time required to produce the vehicle assembly.

We claim:

1. Mounting means usable with a plastic lower frame member adapted to be joined to a plastic upper body member to form a monocoque vehicle assembly, said means being incorporated into the members to enable an engine, a transaxle, drive wheels and steering means to be operatively secured to the vehicle assembly.

2. The invention defined in claim 1 wherein the engine and transaxle are adapted to be assembled as a module with plate means, with the frame member including means for attaching the module to and supporting the module from said assembly.

3. The invention defined in claim 2 wherein the plate means is attachable to mounting means incorporated in one surface of the frame member with spacer means being provided between the plate means and another surface of the frame member for limiting compression forces exerted on the frame member as tightening means secure the plate means to the frame member.

4. The invention defined in claim 2 wherein the module is attached to the edges of the frame member by a plurality of bolts and second plate means.

5. The invention defined in claim 2 wherein the engine includes a power shaft with a drive pulley mounted thereon, the plate means swingably carries a belt-tightening pulley and belt entrained around said drive and belt-tightenting pulleys with means provided on the plate means selectively and swingably biasing the belt-tightenting pulley away from the engine drive pulley to tighten said belt.

6. The invention defined in claim 1 wherein the frame member includes a downwardly extending channel means incorporated in the frame member for mounting a steerable assembly including a pair of steerable wheels.

7. The invention defined in claim 6 wherein the channel means is adapted to support a steerable assembly which includes a cross bar receivable in the channel means, said cross bar being adapted to support pivotable wheel support means.

8. The invention defined in claim 7 wherein the pivotable wheel support means is swingably connected to a rack and pinion steering means that is attachable with support means incorporated into the frame member, the steering means being actuated by steering wheel means carried in a upstanding steering column incorporated into the body member.

9. The invention defined in claim 8 wherein the column houses a steering wheel means which includes an upstanding steering wheel shaft that carries a gear at its lower end portion, the gear being operably engaged with the rack and pinion steering means, said shaft being coupled with a steering wheel at its upper end portion.

10. The invention defined in claim 7 wherein the frame member is adapted to receive bolt means that secure the cross bar within the channel means and to the frame member.

11. The invention defined in claim 7 wherein the frame member is adapted to mount a mower deck therebeneath, said deck including front and rear pairs of draft links pivotally attached to the deck at their lower ends, the upper ends of the pair of rear links being swingably carried by the frame member and the upper ends of the front pair of links being connected with the cross bar.

12. The invention defined in claim 11 wherein connection means between the cross bar and front pair of links permits limited transverse swinging movement of the links relative to the cross bar.

13. The invention defined in claim 1 wherein the body member has incorporated into it means for supporting pivotable brake and clutch pedals.

14. The invention defined in claim 1 wherein the engine, transaxle, drive wheels and steering means are secured to and supported by means incorporated into the frame member, with clutch and brake means being provided that include clutch and brake pedals pivotally mounted on means incorporated into the body member.

15. The invention defined in claim 14 wherein the pedals are mounted for swinging movement inside an upstanding steering column formed in the body member, said pedals having foot engaging portions projecting out of openings provided in the sides of said column.

16. The invention defined in claim 14 wherein the clutch and brake means include respective control linkages that are carried in guide channels incorporated into the two members, the clutch and brake control linkages being respectively operatively connected to the transaxle and drive wheel brake means operatively coupled with the drive wheels.

17. The invention defined in claim 16 wherein the guide channels are comprised of U-shaped slots formed in each member, with the open ends of the slots abutting to form the channels.

18. The invention defined in claim 16 wherein the assembly further includes a parking brake lever means swingably mounted on the frame member, the lever means being operatively coupled to the brake control linkage for releasably securing the brake means in its actuated condition whereby the brake means retard rotation of the wheels.

19. The invention defined in claim 18 wherein the parking brake lever means includes a first portion swingably mounted on the frame member for transverse back and forth movement.

20. The invention defined in claim 19 wherein the lever means includes an arm reciprocally carried within a channel incorporated into the frame member.

21. The invention defined in claim 1 wherein the frame member further incorporates means for pivotally supporting a gear shift lever, a mower deck support linkage, and mower deck height adjustment means.

22. The invention defined in claim 1 wherein there is formed in the body member means for supporting a gear shift lever that is operatively connected to the transaxle, said lever being shiftable in a fore-and-aft and transverse direction.

23. The invention defined in claim 1 wherein the body member includes molded-in color.

24. The invention defined in claim 1 wherein the frame member has incorporated therein a rearwardly extending hitch structure.

25. The invention defined in claim 1 wherein the vehicle is a lawn and garden vehicle, the assembly is adapted to carry a mower deck and the frame member includes support means for adjustably mounting thereto a mower deck lift linkage.

26. The invention defined in claim 25 wherein the lift linkage includes a swingable lift handle pivotably mounted to the frame member for up and down movement and a pair of lift links that extend between the deck and handle with means carried on the frame member for adjustably fixing the lift handle and deck in one of a plurality of elevated positions.

27. The invention defined in claim 1 wherein the assembly has incorporated therein a mounting for a shiftable seat upon which an operator may sit, said mounting comprising means between the frame and body members for supporting and guiding the seat during shifting of the seat, said seat mounting means including a fore-and-aft extending surface abuttable with the seat for transferring the weight of the operator and seat to the members, and a laterally extending surface abuttable with the seat for restricting outwardly shifting of the seat when occupied.

28. The invention defined in claim 27 wherein the support and guide means further includes fore-and-aft aligned indexing means incorporated into the body member for providing a plurality of fore-and-aft locations at which the seat can be positioned.

29. The invention defined in claim 1 wherein the frame member further incorporates means for attaching a plate means to which the engine and transaxle can be mounted.

30. The invention defined in claim 29 wherein the plate means is adapted to also carry the transaxle and associated drive wheels.

31. The invention defined in claim 1 wherein means is further incorporated in the frame member for attaching an engine-transaxle module and a pair of steerable wheels.

32. The invention defined in claim 31 wherein there is further incorporated into the body member means for pivotally supporting a brake pedal.

33. The invention defined in claim 1 wherein the frame member further incorporates means for pivotally supporting a swingable cover adapted to enclose a space formed within the assembly.

34. The invention defined in claim 1 wherein the frame member includes access openings through which a brake linkage means may pass to interconnect a brake pedal carried at one end portion of the assembly and a wheel brake means operatively coupled with the drive wheels.

35. The invention defined in claim 34 wherein means is incorporated into the members for guiding a linkage means, the linkage means being adapted to be reciprocally shifted within the guiding means.

36. The invention defined in claim 1 wherein the body member incorporates access openings through which a brake pedal may pass and pivot support means upon which the pedal may be swingably mounted.

37. The invention defined in claim 1 wherein the frame member incorporates access openings through which a clutch linkage means may pass to interconnect a clutch pedal carried at one end portion of the assembly and a clutch means operatively coupled between the engine and drive wheels.

38. The invention defined in claim 37 wherein there is further incorporated into the members a guide means along which the clutch linkage means may be reciprocally shifted.

39. The invention defined in claim 1 wherein the body member includes access openings through which a clutch pedal may pass and pivot support means upon which a clutch pedal may be swingably mounted.

40. The invention defined in claim 1 wherein the body member further includes an access opening through which a gear shift lever may pass and the frame member includes a pivot support means upon which the lever may be swingably mounted.

41. The invention defined in claim 1 wherein the frame and body members further include load bearing surfaces upon which an operator seating structure can be mounted.

42. The invention defined in claim 41 wherein there is further provided adjustment notches for selectively retaining the seat at selected positions.

43. The invention defined in claim 1 wherein the body member further incorporates pivot supports to which brake and clutch pedals can be swingably mounted, and access openings are provided in the frame member through which brake and clutch linkage means may pass.

44. A fiber reinforced plastic frame member including means formed therein for attaching to the member associated drive wheels, front wheel supports, pivotable steering means and an engine transaxle module having plate means that is attachable to one surface of the frame member, with spacer means being provided between the plate means and a second surface of the frame member for limiting compression forces exerted on the frame member as tightening means secure the plate means to the frame member.

45. A fiber reinforced plastic frame member, including means formed therein for attaching to the member an engine, a transaxle and associated drive wheels, and front wheel supports and pivotable steering means, said means for attaching including a downwardly extending channel means adapted to receive a cross bar means for supporting pivotable wheel support means, the frame member being further adapted to mount a mower deck therebeneath, said deck including front and rear pairs of draft links which are pivotally attached to the deck at their lower end portions, with the front pair being swingably carried at their upper end portions by the cross bar means.

46. A fiber reinforced plastic frame member, including means formed therein for attaching to the member an engine, a transaxle and associated drive wheels, and front wheel support and pivotable steering means; said means for attaching including a downwardly extending channel means adapted to receive a cross bar means for supporting pivotable wheel support means, the frame member being further adapted to mount a mower deck therebeneath, said deck including front and rear pairs of draft links which are pivotally attached to the deck at their lower end positions, with the front pair being swingably carried at their upper end portions by the cross bar means for limited transverse swinging movement.

47. A monocoque vehicle assembly comprised of a fiber reinforced lower frame member joined to a plastic upper body, the frame member being adapted for mounting an engine, a transaxle, associated drive wheels and steerable wheels therewith, the body member being adapted to mount clutch and brake pedals with the pedals being carried for swinging movement inside an upstanding steering column formed in the body member, with foot engaging portions projecting out of the and to the sides of column.

48. A monocoque vehicle assembly comprised of a fiber reinforced lower frame member joined to a plastic upper body member, said members including means formed therein and therebetween for attaching an engine, a transaxle and a pair of associated drive wheels, a pair of steerable wheels, steering means for the steerable wheels, clutch and brake means and a mounting for a fore-and-aft shiftable operator seat including means between the frame and body members for supporting and guiding the seat during shifting, the means including a fore-and-aft extending surface abuttable with the seat for transferring the weight of the operator and seat to the members, a laterally extending surface abuttable with the seat for restricting outwardly shifting of the seat when occupied, and fore-and-aft aligned indexing means carried by the body member for defining a plurability of fore-and-aft locations at which the seat can be positioned.

49. Mounting means usable with a plastic lower frame member adapted to be joined with a plastic upper body member to form a monocoque vehicle assembly having a compartmentilized area formed by the assembled members, the area including an opening in the frame member through which an engine may be received and operatively secured to the assembly.

50. The invention defined in claim 49 wherein the opening has a rim portion to which connecting means may be used to secure the assembly.

51. The invention defined in claim 49 wherein a second compartmentilized area is formed between the members with an access opening being provided in one member through which linkage means may pass to operatively interconnect a brake pedal carried at the front portion of the assembly with a brake means operatively connected to drive wheels supported at the rear portion of the assembly.

52. The invention defined in claim 51 wherein the frame member further includes access openings through which a second linkage means may pass to operatively interconnect a clutch pedal carried at the front of the assembly with a clutch means operatively carried between the engine and the drive wheels.

53. The invention defined in claim 47 wherein the upper body member includes an upstanding steering column at its front end portion, the column having an enclosure adapted to permit a steering shaft to be operatively mounted therein for controlling steerable wheels carried by the assembly.

54. The invention defined in claim 49 wherein the assembly further includes a gear shift linkage enclosure between the members wherein a gear shift control lever may be operatively mounted.

55. The invention defined in claim 51 wherein the shift linkage enclosure is adapted to operatively receive a parking brake linkage which is connectable to a gear shift control lever.

* * * * *